United States Patent
Kim et al.

(10) Patent No.: US 7,991,090 B2
(45) Date of Patent: Aug. 2, 2011

(54) METHOD AND SYSTEM FOR REORDERED QRV-LST (LAYERED SPACE TIME) DETECTION FOR EFFICIENT PROCESSING FOR MULTIPLE INPUT MULTIPLE OUTPUT (MIMO) COMMUNICATION SYSTEMS

(75) Inventors: Joonsuk Kim, San Jose, CA (US); Sirikiat Lek Ariyavisitakul, Alpharetta, GA (US); Eric Ojard, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 1242 days.

(21) Appl. No.: 11/417,688

(22) Filed: May 4, 2006

(65) Prior Publication Data

US 2007/0258536 A1    Nov. 8, 2007

(51) Int. Cl.
  *H04B 7/10* (2006.01)
(52) U.S. Cl. ........ 375/347; 375/260; 375/267; 375/316; 375/342; 375/357; 370/338; 370/342; 370/538
(58) Field of Classification Search ................. 375/219, 375/260, 267, 295, 316, 346, 347, 348, 222, 375/285, 299, 306, 262, 264, 250, 259, 292, 375/342, 350; 370/203, 252, 210, 208, 342
See application file for complete search history.

(56) References Cited

U.S. PATENT DOCUMENTS

| | | | |
|---|---|---|---|
| 2006/0164970 A1* | 7/2006 | Lee et al. | 370/208 |
| 2006/0215781 A1* | 9/2006 | Lee et al. | 375/267 |
| 2006/0274702 A1* | 12/2006 | Li et al. | 370/338 |
| 2007/0086539 A1* | 4/2007 | Hocevar | 375/267 |
| 2007/0115909 A1* | 5/2007 | Wang et al. | 370/342 |
| 2007/0206696 A1* | 9/2007 | Su | 375/267 |
| 2007/0213013 A1* | 9/2007 | Kim | 455/69 |
| 2007/0237252 A1* | 10/2007 | Li | 375/264 |
| 2007/0280386 A1* | 12/2007 | Waes et al. | 375/347 |
| 2008/0112504 A1* | 5/2008 | Jiang et al. | 375/296 |
| 2008/0187066 A1* | 8/2008 | Wang et al. | 375/267 |
| 2008/0285670 A1* | 11/2008 | Walton et al. | 375/260 |

FOREIGN PATENT DOCUMENTS

CN    1706133    12/2005

OTHER PUBLICATIONS

Yi Jiang et al., "Uniform Channel decomposition for MIMO Communications," IEEE Transactions on Signal Porcessing, vol. 53, No. 11, Nov. 2005, pp. 4283-4294.

* cited by examiner

*Primary Examiner* — Shuwang Liu
*Assistant Examiner* — Hirdepal Singh
(74) *Attorney, Agent, or Firm* — McAndrews, Held & Malloy, Ltd.

(57) ABSTRACT

Aspects of a method and system for reordered QRV-LST (layered space time) detection for efficient processing for multiple input multiple output (MIMO) communication systems are presented. The method may include receiving an ordered plurality of signals wherein each of the ordered plurality of received signals comprises information contained in an ordered plurality of spatial streams. Each spatial stream may comprise one or more frequency carriers, or tones. Information, or data, contained in a corresponding one of the ordered plurality of spatial streams may be detected. The order in which the information is detected may be determined for each individual frequency carrier.

20 Claims, 6 Drawing Sheets

METHOD AND SYSTEM FOR REORDERED QRV-LST (LAYERED SPACE TIME) DETECTION FOR EFFICIENT PROCESSING FOR MULTIPLE INPUT MULTIPLE OUTPUT (MIMO) COMMUNICATION SYSTEMS

CROSS-REFERENCE TO RELATED APPLICATIONS/INCORPORATION BY REFERENCE

Not Applicable.

FIELD OF THE INVENTION

Certain embodiments of the invention relate to wireless communication. More specifically, certain embodiments of the invention relate to a method and system for reordered QRV-LST (layered space time) detection for efficient processing for multiple input multiple output (MIMO) communication systems.

BACKGROUND OF THE INVENTION

In multiple input multiple output (MIMO) wireless systems, multiple data streams may be transmitted simultaneously using a plurality of transmitting antennas. A MIMO receiver may utilize a plurality of receiving antennas to decouple, and detect individual data streams. Two predominant methods for MIMO transmission include singular value decomposition (SVD), and layers space-time (LST) processing, also known as successive interference cancellation (SIC).

SVD may use beamforming in conjunction with a transmitter antenna array and receiver antenna array to create virtual channels, or eigen-channels, through which multiple data streams may be sent without interfering with one another. LST/SIC may use receiver antennal array processing to detect the multiple data streams, one stream at a time. For each detection "layer," the interference from yet undetected streams may be nulled out, while the interference from already detected streams may be cancelled, or subtracted, out.

The eigen-channels in SVD may have highly unequal signal to noise ratios (SNR), depending on the eigen-spread of the MIMO channel matrix. SVD may also rely upon adaptive modulation, or bit loading, to achieve greater data transfer rates for eigen-channels associated with higher SNR values, while simultaneously supporting lower data transfer rates for eigen-channels associated with lower SNR values. SVD may also suffer performance loss, by not achieving the peak theoretical data transfer rate aggregated among the eigen-channels when a broad range of modulation types are not available. For example, if a maximum data transfer rate associated with an eigen-channel requires a 1024 QAM modulation type, the maximum data transfer rate may not be achievable if the required modulation type is not available to be utilized.

LST/SIC approaches may suffer performance losses as a result of error propagation. For example, if a current layer is detected in error, the error may propagate to other layers increasing the probability that subsequent layers may also be detected in error. Some methods, such as vertical LST (VLST) may provide error protection through coding of each data stream. Based on the coding, decisions may be made subsequent to decoding to subtract out interference.

Alternatively, precoding based on dirty paper theory, for example Tomlinson-Harashima precoding (THP), may be utilized to pre-cancel interference at the transmitter without requiring the signals to be transmitted with greater levels of transmitted radiated power. The THP approach may require channel knowledge at the transmitter.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for reordered QRV-LST (layered space time) detection for efficient processing for multiple input multiple output (MIMO) communication systems, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention relate to a method and system for quantization for reordered QRV-LST (layered space time) detection for efficient processing for multiple input multiple output (MIMO) communication systems. Various embodiments of the invention may enable concurrently receiving of an ordered plurality of signals. Each of the ordered plurality of concurrently received signals may comprise information contained in an ordered plurality of spatial streams. Each spatial stream may comprise one or more frequency carriers, or tones. Information, or data, contained in a corresponding one of the ordered plurality of spatial streams may be detected. The order in which the information is detected may be determined for each individual frequency carrier.

Figure 1:
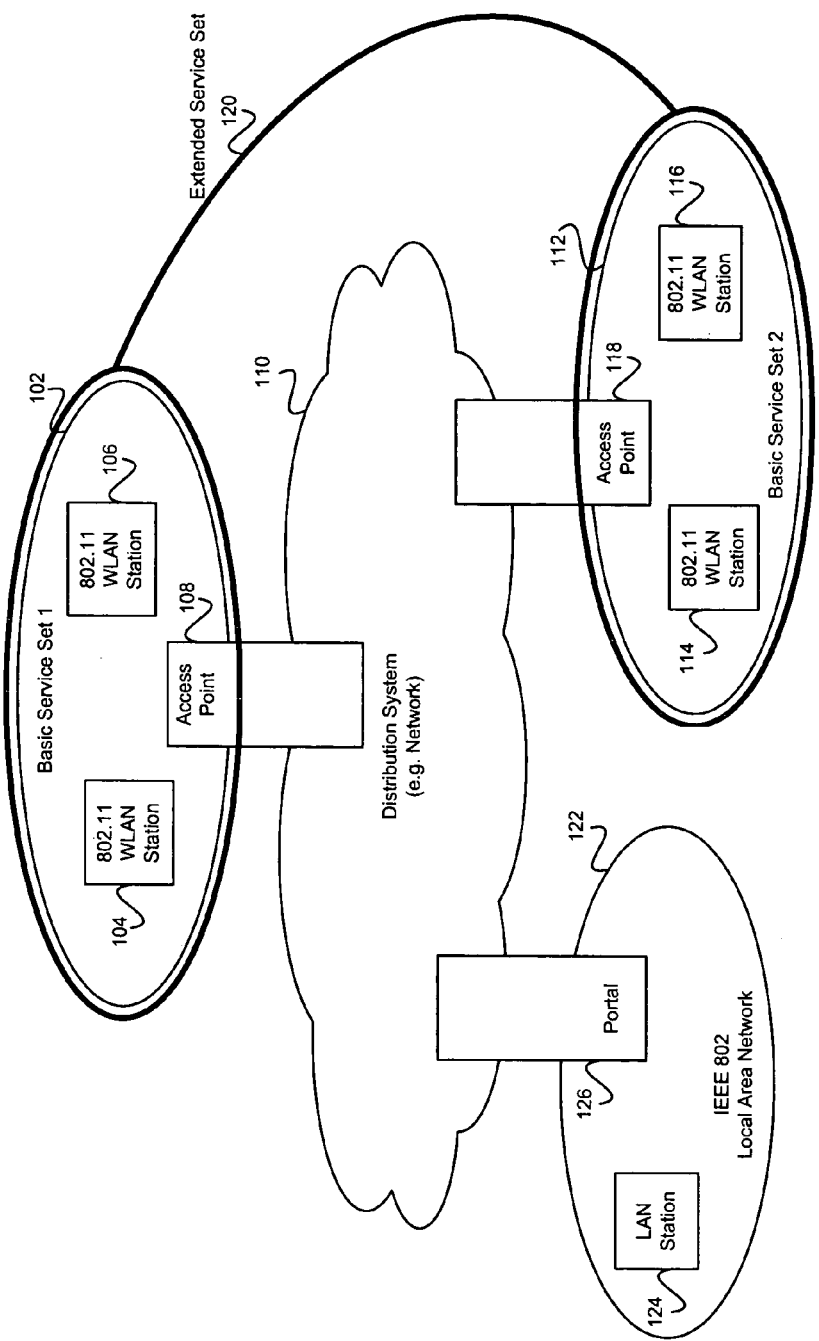
FIG. 1 is a block diagram of an exemplary system for wireless data communications, which may be utilized in connection with an embodiment of the invention.

FIG. 1 is a block diagram of an exemplary system for wireless data communications, which may be utilized in connection with an embodiment of the invention. With reference to FIG. 1, there is shown a distribution system (DS) 110, an extended service set (ESS) 120, and an IEEE 802.x LAN 122. The ESS 120 may comprise a first basic service set (BSS) 102, and a second BSS 112. The first BSS 102 may comprise a first 802.11 WLAN station 104, a second 802.11 WLAN station 106, and an access point (AP) 108. The second BSS 112 may comprise a first 802.11 WLAN station 114, a second 802.11 WLAN station 116, and an access point (AP) 118. The IEEE 802 LAN 122 may comprise a LAN station 124, and a portal 126. An IEEE 802.11 WLAN station, or IEEE 802.11 WLAN device, is a WLAN system that may be compliant with at least a portion of the IEEE 802.11 standard.

A WLAN is a communications networking environment that comprises a plurality of WLAN devices that may communicate wirelessly via one or more uplink and/or downlink RF channels. The BSS 102 or 112 may be part of an IEEE 802.11 WLAN that comprises at least 2 IEEE 802.11 WLAN stations, for example, the first 802.11 WLAN station 104, the second 802.11 WLAN station 106, and the AP 108, which may be members of the BSS 102. Non-AP stations within BSS 102, the first 802.11 WLAN station 104, and the second 802.11 WLAN station 106, may individually form an association with the AP 108. An AP, such as AP 108, may be implemented as an Ethernet switch, bridge, or other device in a WLAN, for example. Similarly, non-AP stations within BSS 112, the first 802.11 WLAN station 114, and the second 802.11 WLAN station 116, may individually form an association with the AP 118. Once an association has been formed between a first 802.11 WLAN station 104 and an AP 108, the AP 108 may communicate reachability information about the first 802.11 WLAN station 104 to other APs associated with the ESS 120, such as AP 118, and portals such as the portal 126. The WLAN station 104 may subsequently communicate information wirelessly via the BSS 102. In turn, the AP 118 may communicate reachability information about the first 802.11 WLAN station 104 to stations in BSS 112. The portal 126, which may be implemented as, for example, an Ethernet switch or other device in a LAN, may communicate reachability information about the first 802.11 WLAN station 104 to stations in LAN 122 such as the 802 LAN station 124. The communication of reachability information about the first 802.11 WLAN station 104 may enable WLAN stations that are not in BSS 102, but are associated with ESS 120, to communicate wirelessly with the first 802.11 WLAN station 104.

The DS 110 may provide an infrastructure which enables a first 802.11 WLAN station 104 in one BSS 102, to communicate wirelessly with a first 802.11 WLAN station 114 in another BSS 112. The DS 110 may also enable a first 802.11 WLAN station 104 in one BSS 102 to communicate with an 802 LAN station 124 in an IEEE 802 LAN 122, implemented as, for example a wired LAN. The AP 108, AP 118, or portal 126 may provide a means by which a station in a BSS 102, BSS 112, or LAN 122 may communicate information via the DS 110. The first 802.11 WLAN station 104 in BSS 102 may communicate information wirelessly to a first 802.11 WLAN station 114 in BSS 112 by transmitting the information wirelessly to AP 108, which may transmit the information via the DS 110 to AP 118, which in turn may transmit the information wirelessly to station 114 in BSS 112. The first 802.11 WLAN station 104 may communicate information wirelessly to the 802 LAN station 124 in LAN 122 by transmitting the information wirelessly to AP 108, which may transmit the information via the DS 110 to the portal 126, which in turn may transmit the information to the 802 LAN station 124 in LAN 122. The DS 110 may utilize wireless communications via an RF channel, wired communications, such as IEEE 802 Ethernet, or a combination thereof.

A WLAN station or AP may utilize one or more transmitting antennas, and one or more receiving antennas when communicating information. A WLAN station or AP that utilizes a plurality of transmitting antennas and/or a plurality of receiving antennas may be referred to as a multiple input multiple output (MIMO) system.

Figure 2:
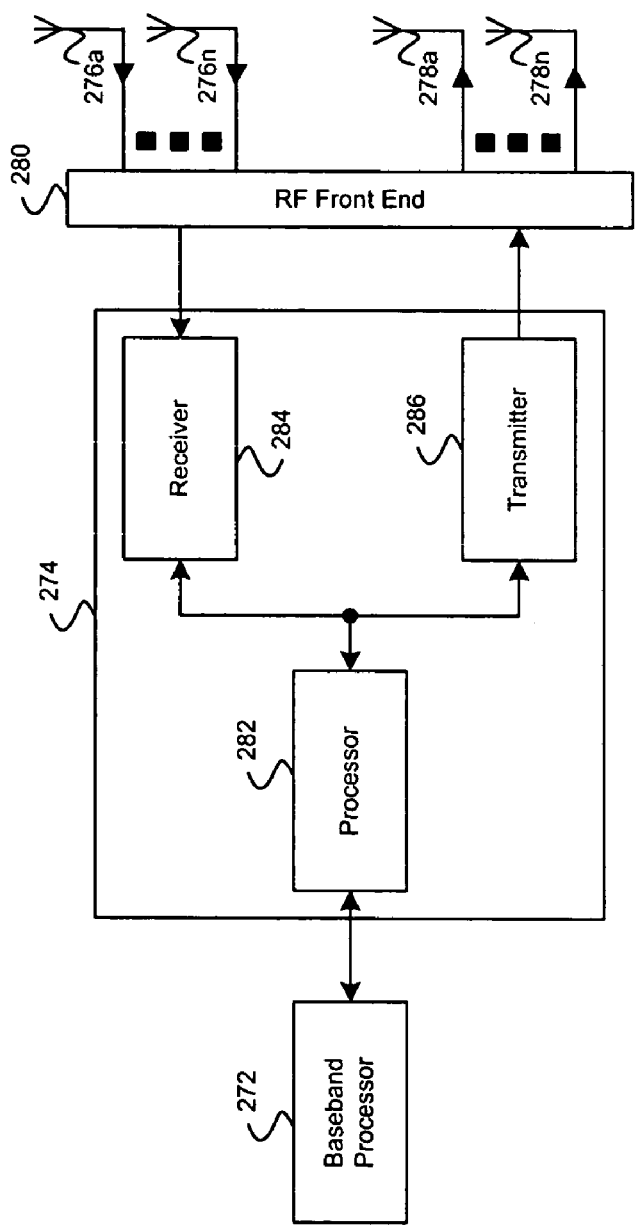
FIG. 2 is a block diagram of an exemplary MIMO system that may be utilized in connection with an embodiment of the invention.

FIG. 2 is a block diagram of an exemplary MIMO system that may be utilized in connection with an embodiment of the invention. With reference to FIG. 2 there is shown a baseband processor 272, a transceiver 274, an RF front end 280, a plurality of receiving antennas 276a, . . . , 276n, and a plurality of transmitting antennas 278a, . . . , 278n. The transceiver 274 may comprise a processor 282, a receiver 284, and a transmitter 286.

The processor 282 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. The baseband processor 272 may perform functions in accordance with applicable communications standards. These functions may comprise, but are not limited to, tasks related to analysis of data received via the receiver 284, and tasks related to generating data to be transmitted via the transmitter 286. These tasks may further comprise medium access control (MAC) layer functions as specified by pertinent standards.

The receiver 284 may perform digital receiver functions that may comprise, but are not limited to, fast Fourier transform processing, beamforming processing, equalization, demapping, demodulation control, deinterleaving, depuncture, and decoding. The transmitter 286 may perform digital transmitter functions that comprise, but are not limited to, coding, puncture, interleaving, mapping, modulation control, inverse fast Fourier transform processing, beamforming processing. The RF front end 280 may receive analog RF signals via antennas 276a, . . . , 276n, converting the RF signal to baseband and generating a digital equivalent of the received analog baseband signal. The digital representation may be a complex quantity comprising I and Q components. The RF front end 280 may also transmit analog RF signals via an antenna 278a, . . . , 278n, converting a digital baseband signal to an analog RF signal.

In operation, the processor 282 may receive data from the receiver 284. The processor 282 may communicate received data to the baseband processor 272 for analysis and further processing. The baseband processor 272 may generate data to be transmitted via an RF channel by the transmitter 286. The baseband processor 272 may communicate the data to the processor 282. The processor 282 may generate a plurality of bits that are communicated to the receiver 284. The processor 282 may generate signals to control the operation of the modulation process in the transmitter 286, and of the demodulation process in the receiver 284.

A MIMO receiver may concurrently receive a plurality of signals, each of which may comprise information contained in a plurality of spatial streams. A MIMO transmitter may concurrently transmit a plurality of signals, each of which may comprise information contained in a plurality of spatial streams. The plurality of transmitted signals may be concurrently transmitted from the MIMO transmitter, via a wireless communications medium, and concurrently received by the MIMO receiver as a plurality of received signals. Each spatial stream may comprise one or more frequency carriers. As such, a portion of the information may be associated with a corresponding one of the plurality of spatial streams. The portion of information may be represented as binary information wherein at least a portion of the bits in the binary representation may be associated with a corresponding one or more frequency carriers. A portion of the bits associated with a single frequency carrier may be referred to as a symbol, and a sum comprising the total number of bits simultaneously associated with the collective plurality of frequency carriers may be referred to as a orthogonal frequency division multiplexing (OFDM) symbol. The collective plurality of frequency carriers may be associated with an RF channel.

The plurality of spatial streams may be ordered in the sense that for a given plurality of N spatial streams, where N is a number representing the total number of spatial streams, there may be an identified $1^{st}$ spatial stream, an identified $2^{nd}$ spatial stream, ..., and an identified $N^{th}$ spatial stream, for example. Similarly, the plurality of transmitted signals, and the plurality of received signals, may be ordered. Each of the ordered plurality of received signals may correspond to an ordered plurality of transmitted signals. The ordered plurality of transmitted signals may comprise a weighted combination of symbols from each of the ordered plurality of spatial streams. The weights utilized for combining the symbols may vary by frequency carrier for a given one of the ordered plurality of transmitted signals. The weights utilized for combining the symbols may vary among the ordered plurality of transmitted spatial streams for a given frequency carrier. The plurality of weights corresponding to each of the plurality of frequency carriers may be represented as a beamforming matrix. Each of the weights may be represented as a matrix element within the beamforming matrix.

The beamforming matrix may comprise a 3-dimensional matrix wherein a first dimension may comprise a plurality of rows. The number of rows may correspond to the number of signals in the ordered plurality of transmitted signals. Each row may correspond to one of the ordered plurality of transmitted signals. A second dimension may comprise a plurality of columns. The number of columns may correspond to the number of spatial streams in the ordered plurality of spatial streams. Within a given row, each column may comprise a weight corresponding to one of the ordered plurality of spatial streams. The row and column may define a 2-dimensional beamforming submatrix comprising weights associated with a single frequency carrier. A third dimension may comprise a plurality of the 2-dimensional beamforming submatrices, each of which comprises weights associated with a corresponding frequency carrier in the collective plurality of frequency carriers.

At the MIMO receiver, for a given received signal, other signals in the ordered plurality of received signals may represent interference signals. Within a given received signal, for a given symbol comprising information associated with a given spatial stream, other symbols associated with other spatial streams in the ordered plurality of spatial streams may represent interference symbols. In a layered space time (LST) MIMO communication system, the ordered plurality of received signals may correspond to a plurality of layers. In a LST MIMO transmitter, the matrix elements in each 2-dimensional beamforming submatrix may form an upper triangular matrix or a lower triangular matrix. The upper triangular or lower triangular form may enable an LST MIMO receiver to utilize a zero-forcing (ZF) approach.

In a ZF approach, a MIMO receiver may detect an estimated value for a first symbol in a given spatial stream, which does not comprise statistically significant interference symbols. Having detected the estimated value for the first symbol, the MIMO receiver may detect an estimated value for the second symbol in a subsequent spatial stream that comprises statistically significant interference from the first symbol only. Having previously detected an estimated value for the first symbol, the estimated value for the second symbol may be determined. The process may continue and an estimated value for a current symbol may be detected in a current spatial stream that comprises statistically significant interference from the plurality of symbols whose estimated values have already been determined. The ZF approach may also be referred to as successive interference cancellation (SIC). The process of successive cancellation may result in what may be referred to as a reliable detection of symbols.

In a MIMO transmitter, the spatial stream that contains the first symbol transmitted may vary according to frequency carrier. For example, for a first frequency carrier, the first symbol transmitted may be associated with a first spatial stream in the ordered plurality of spatial streams, but for a second frequency carrier, the first symbol transmitted may be associated with a second spatial stream in the ordered plurality of spatial streams. Consequently, the variation in the order of transmission of symbols based on the frequency carrier may require that the MIMO receiver detect the symbols in the ordered plurality of received signals in a corresponding order.

In some conventional MIMO systems, the MIMO transmitter may utilize a beamforming matrix that comprises a single 2-dimensional matrix wherein the weights utilized for combining spatial streams does not vary by frequency carrier. This may require that the MIMO receiver, utilizing the SIC approach, detect a symbol associated with a specific spatial stream prior to detecting symbols associated with the remainder of the ordered plurality of spatial streams for each of the plurality of frequency carriers contained within a concurrently received ordered plurality of signals. For example, the MIMO receiver may be required to detect the first symbol in the first spatial stream in the ordered plurality of spatial streams for each frequency carrier. That the MIMO transmitter may vary the spatial stream utilized for transmitting the first symbol based on the frequency carrier may require that the MIMO receiver temporarily store, or buffer, symbols received prior to a symbol associated with the specific spatial stream. For example, if the MIMO transmitter transmitted a symbol associated with a third spatial stream first, for a given frequency carrier contained within a concurrently received ordered plurality of signals, the MIMO receiver may be required to buffer the received symbol until subsequently receiving a symbol associated with the first spatial stream.

The buffering requirement may result in increased latency in processing the concurrently received ordered plurality of signals. In the example from above, an attempt by the MIMO receiver to avoid a buffering requirement and/or the attending increased latency by detecting the symbol associated with the third spatial stream first may result in an unreliable detection of the symbol because the detected symbol may comprise interference symbols, for example, from the first and/or second spatial streams.

Various embodiments of the invention may comprise a method and system wherein a MIMO receiver may generate a reordered plurality of spatial streams in response to a MIMO transmitter, which utilizes a beamforming matrix that comprises a 3-dimensional matrix, in which beamforming factors vary according to frequency carrier. The reordered plurality of spatial streams may enable the MIMO receiver to detect the first symbol received for each of the plurality of frequency carriers contained in an ordered plurality of concurrently received signals. In one aspect of the invention, the MIMO receiver may reliably detect the first symbol received for each of the frequency carriers associated with a concurrently received plurality of signals without requiring buffering of received symbols associated with one or more frequency carriers. An exemplary MIMO transmitter and/or MIMO receiver may be contained within a wireless local area network (WLAN) station.

Figure 3:
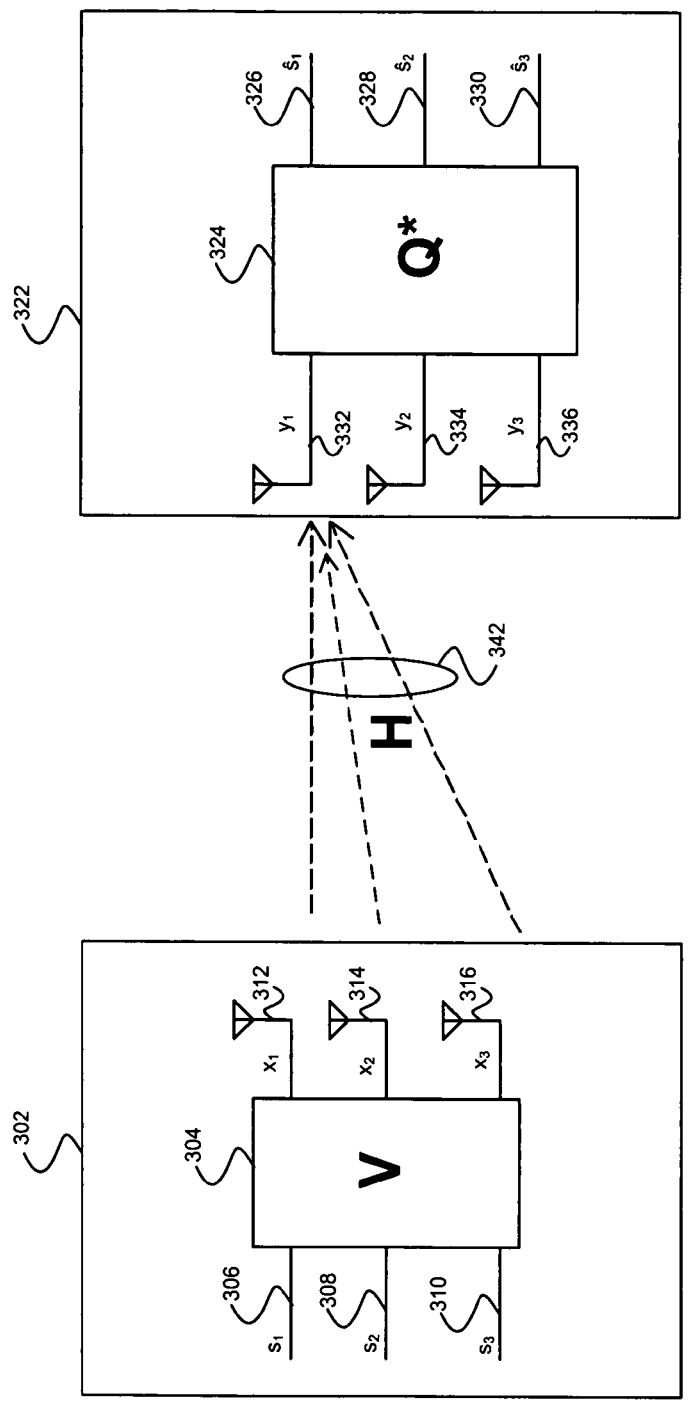
FIG. 3 is an exemplary diagram illustrating layered space time communication in a MIMO communication system that may be utilized in connection with an embodiment of the invention.

FIG. 3 is an exemplary diagram illustrating beamforming that may be utilized in connection with an embodiment of the invention. Referring to FIG. 3 there is shown a transmitting mobile terminal 302, a receiving mobile terminal 322, and a plurality of RF channels 342. The transmitting mobile terminal 302 comprises a transmit filter coefficient block V 304, a first spatial stream $s_1$ 306, a second spatial stream $s_2$ 308, a third spatial stream $s_3$ 310, and a plurality of transmitting antenna 312, 314, and 316. The receiving mobile terminal 322 comprises a receive filter coefficient block Q* 324, a first destination stream $\hat{s}_1$ 326, a second destination stream $\hat{s}_2$ 328, a third destination stream $\hat{s}_3$ 330, and a plurality of receiving antenna 332, 334, and 336. An exemplary mobile terminal may be a WLAN station 104, for example. A corresponding matrix V may be associated with the transmit filter coefficient block V 304. A corresponding matrix Q* may be associated with the receive filter coefficient block Q* 324. The matrices V and Q* may be utilized in connection with beamforming and QRV-LST detection.

In operation, the transmitting antenna 312 may enable transmission of a signal $x_1$, the transmitting antenna 314 may enable transmission of a signal $x_2$, and the transmitting antenna 316 may enable transmission of a signal $x_3$. In a beamforming operation, each of the transmitted signals $x_1$, $x_2$, and $x_3$ may be a function of a weighted summation of at least one of the ordered plurality of the spatial streams $s_1$, $s_2$, and $s_3$. The weights may be determined by the beamforming V matrix such that:

$$X = V S_S \qquad \text{equation [1]}$$

where X may be a 3×1 vector representation of the ordered plurality of concurrently transmitted signals $x_1$, $x_2$, and $x_3$, for example:

$$X = \begin{bmatrix} x_1 \\ x_2 \\ x_3 \end{bmatrix} \qquad \text{equation [2]}$$

$S_S$ may be a 3×1 vector representation of the ordered plurality of spatial streams $s_1$, $s_2$, and $s_3$, for example:

$$S_s = \begin{bmatrix} s_1 \\ s_2 \\ s_3 \end{bmatrix} \qquad \text{equation [3]}$$

and V may be a 3×3 matrix representation of the beamforming V matrix, for example:

$$V[f_k] = \begin{bmatrix} v_{11}[f_k] & v_{12}[f_k] & v_{13}[f_k] \\ v_{21}[f_k] & v_{22}[f_k] & v_{23}[f_k] \\ v_{31}[f_k] & v_{32}[f_k] & v_{33}[f_k] \end{bmatrix} \qquad \text{equation [4]}$$

wherein each matrix element $v_{ij}[f_k]$ may represent a weight utilized for beamforming. Each matrix element $v_{ij}[f_k]$ may be associated with a frequency carrier $f_k$, wherein $f_k$ may represent one of a plurality of frequency carriers associated with an RF channel, and k represents an index that comprises a range of values:

$$-\frac{N_{SC}}{2} \le k \le \frac{N_{SC}}{2} \qquad \text{equation [4a]}$$

where $N_{SC}$ may represent a number of frequency carriers associated with the RF channel. A value for $v_{ij}[f_l]$ may not be equal to a value for $v_{ij}[f_m]$.

The receiving antenna 332 may receive a signal $y_1$, the receiving antenna 334 may receive a signal $y_2$, and the receiving antenna 336 may receive a signal $y_3$. The plurality of RF channels 342 may be characterized mathematically by a transfer coefficient matrix H. The transfer coefficient matrix H may also be referred to as a channel estimate matrix.

The ordered plurality of concurrently received signals $y_1$, $y_2$, $y_3$, may be expressed as a function of the plurality of transmitted signals $x_1$, $x_2$, $x_3$, and the transfer coefficient matrix H in the following equation, for example:

$$Y = HX + N_C \qquad \text{equation [5]}$$

where Y may be a 3×1 vector representation of the received signals $y_1$, $y_2$, and $y_3$, for example:

$$Y = \begin{bmatrix} y_1 \\ y_2 \\ y_3 \end{bmatrix} \qquad \text{equation [6]}$$

H may be a 3×3 matrix representation of the transfer coefficient matrix, for example:

$$H = \begin{bmatrix} h_{11} & h_{12} & h_{13} \\ h_{21} & h_{22} & h_{23} \\ h_{31} & h_{32} & h_{33} \end{bmatrix} \qquad \text{equation [7]}$$

and $N_C$ may be a 3×1 vector representation of noise that may exist in the communications medium, for example:

$$N_C = \begin{bmatrix} n_1 \\ n_2 \\ n_3 \end{bmatrix} \qquad \text{equation [8]}$$

In a system for QRV-LST detection, the matrix H may be represented by a QRV decomposition, as in the following equation:

$$H = QRV^* \qquad \text{equation [9]}$$

where Q and V may represent unitary matrices where:

$$QQ^* = Q^*Q = I \qquad \text{equation [10]}$$

and $$VV^* = V^*V = I \qquad \text{equation [11]}$$

and V* may represent an Hermitian transpose for the beamforming matrix V, and Q* may represent an Hermitian transpose for the matrix Q. The matrix R may represent an upper triangular matrix, or a lower triangular matrix in various embodiments of the invention. The matrix elements associated with the matrix R may each be represented by a real number.

Various embodiments of the invention may utilize geometric mean decomposition (GMD), which may also be referred to as uniform channel decomposition (UCD). In embodiments of the invention that utilize GMD, the diagonal matrix elements in the matrix R may be equal such that $r_{ii}=r_{jj}$, where $r_{ii}$ may represent an $i^{th}$ diagonal matrix element and $r_{jj}$ may represent a value associated with a $j^{th}$ diagonal matrix element.

By substituting equations [1] and [9] in equation [5], the ordered plurality of concurrently received signals may be represented based on the ordered plurality of spatial streams as in the following equation:

$$Y=QRV^*VS_S+N_C \qquad \text{equation [12a]}$$

$$Y=QRS_S+N_C \qquad \text{equation [12b]}$$

An ordered plurality of destination streams, $\hat{s}_i$, where the index i may comprise values 1, 2, . . . , N (where N may represent a number of spatial streams, for example), may be represented as a destination stream vector $\hat{S}_R$. The destination stream vector, $\hat{S}_R$, may be represented as an N×1 column vector as follows:

$$\hat{S}_R = \begin{bmatrix} \hat{s}_1 \\ \hat{s}_2 \\ \vdots \\ \hat{s}_N \end{bmatrix} \qquad \text{equation [13]}$$

The ordered plurality of destination streams may be represented based on the ordered plurality of spatial streams as in the following equation:

$$\hat{S}_R=Q^*Y=Q^*QRS_S+Q^*N_C \qquad \text{equation [14a]}$$

$$\hat{S}_R=RS_S+Q^*N_C \qquad \text{equation [14b]}$$

where the value for a symbol contained within a destination stream, $\hat{s}_i$, may represent a statistical estimate for the value of a corresponding symbol contained in the spatial stream $s_i$.

An exemplary N×N upper triangular matrix $R[f_k]$ may be represented as a 3-dimensional matrix in the following equation:

$$R[f_k] = \begin{bmatrix} r_{11}[f_k] & r_{12}[f_k] & \cdots & r_{1N}[f_k] \\ 0 & r_{22}[f_k] & r_{23}[f_k] & \cdots & r_{2N}[f_k] \\ \vdots & \ddots & \ddots & & \vdots \\ 0 & \cdots & & 0 & r_{NN}[f_k] \end{bmatrix} \qquad \text{equation [15]}$$

where each $r_{ij}[f_k]$ may be associated with a frequency carrier $f_k$, wherein $f_k$ may represent one of a plurality of frequency carriers associated with an RF channel, and k represents an index that comprises a range of values as shown in equation [4a]. A value for $r_{ij}[f_l]$ may not be equal to a value for $r_{ij}[f_m]$.

In various embodiments of the invention, a MIMO receiver 322 may detect a symbol associated with an $i^{th}$ spatial stream, $s_i$, without interference symbols associated with other spatial streams when the $i^{th}$ spatial stream is transmitted first by a MIMO transmitter 302 for a given frequency carrier $f_k$. This may be achieved by constructing a permuted beamforming matrix $\tilde{V}$ as in the following equation, for example:

$$\tilde{V}[f_k]=[V_n[f_k]V_{n-1}[f_k]\ldots V_1[f_k]]\times P \qquad \text{equation [16]}$$

where may $V_i[f_k]$ represent an $i^{th}$ column in the beamforming V matrix as shown in equation [4], and P may represent a permutation matrix. An exemplary P matrix may be represented by an N×N matrix wherein each column contains 1 entry whose value is equal to 1, and a plurality of N−1 entries whose values are equal to 0. Furthermore, each row may contain 1 entry whose value is equal to 1, and a plurality of N−1 entries whose values are equal to 0. For example, when the P matrix is an identity matrix:

$$P = \begin{bmatrix} 1 & 0 & \cdots & 0 \\ 0 & 1 & \ddots & \vdots \\ \vdots & \ddots & \ddots & 0 \\ 0 & \cdots & 0 & 1 \end{bmatrix} \qquad \text{equation [17]}$$

the permuted beamforming matrix $\tilde{V}$ may be represented as in the following equation:

$$\tilde{V}[f_k]=[V_n[f_k]V_{n-1}[f_k]\ldots V_1[f_k]] \qquad \text{equation [18]}$$

In various embodiments of the invention, a MIMO transmitter may utilize the permuted beamforming matrix $\tilde{V}$ when concurrently transmitting an ordered plurality of signals X. Consequently, equation [12a] may be modified as in the following equation:

$$Y=QRV^*\tilde{V}S_S+N_C \qquad \text{equation [19a]}$$

$$Y=QRPS_S+N_C \qquad \text{equation [19b]}$$

where the ordered plurality of spatial streams $S_S$ may be represented as in the following equation:

$$S_S = \begin{bmatrix} s_N \\ s_{N-1} \\ \vdots \\ s_1 \end{bmatrix} \qquad \text{equation [19c]}$$

The matrix product $PS_S$ in equations [19a] and [19b] may represent a reordered plurality of spatial streams, $S_S'$:

$$S'_S=PS_S \qquad \text{equation [20]}$$

In various embodiments of the invention, a MIMO receiver may utilize the permutation matrix to detect symbols associated with each of a plurality of reordered spatial streams in the order in which the symbols were transmitted by the MIMO transmitter. This may enable reliable QRV-LST detection without requiring buffering of symbols associated with other spatial streams in the reordered plurality of spatial streams. The corresponding reordered plurality of destination streams, $\tilde{S}_R$, may be determined based on the ordered plurality of destination streams, $\hat{S}_R$, according in the following equation:

$$\tilde{S}_R=P\hat{S}_R \qquad \text{equation [21a]}$$

and correspondingly:

$$\hat{S}_R=P^T\tilde{S}_R \qquad \text{equation [21b]}$$

where the reordered plurality of destination streams may be represented according to the following equation:

$$\tilde{S}_R = \begin{bmatrix} \tilde{s}_N \\ \tilde{s}_{N-1} \\ \vdots \\ \tilde{s}_1 \end{bmatrix} \quad \text{equation [21c]}$$

and where $P^T$ may represent a transpose for the permutation matrix P.

A MIMO transmitter may vary the permutation matrix, P, according to a frequency carrier. For example, for a MIMO transmitter that utilizes a plurality of 3 spatial streams, and concurrently transmits a plurality of 3 signals, a permutation matrix, $P[f_1]$, associated with a first carrier frequency, $f_1$, may be represented as in the following equation:

$$P[f_1] = \begin{bmatrix} 1 & 0 & 0 \\ 0 & 1 & 0 \\ 0 & 0 & 1 \end{bmatrix} \quad \text{equation [22]}$$

wherein the MIMO transmitter transmits a first symbol via the first spatial stream $s_1$, a second symbol via the second spatial stream $s_2$, and a third symbol via the third spatial stream $s_3$. The corresponding ordered plurality of spatial streams may be represented according to equations [21b] and [21c] in the following equation:

$$\hat{S}_R = \begin{bmatrix} s_3 \\ s_2 \\ s_1 \end{bmatrix} \quad \text{equation [23]}$$

Based on equation [19b] a MIMO receiver may reliably detect the first symbol associated with the first spatial stream. After detecting the first symbol, the MIMO receiver may reliably detect the second symbol associated with the second spatial stream. After detecting the first and second symbols, the MIMO receiver may reliably detect the third symbol associated with the third spatial stream. Since the MIMO receiver may receive the first symbol at a first time instant, the second symbol at a subsequent second time instant, and the third symbol at a subsequent third time instant, the MIMO receiver may reliably detect the first symbol without being required to buffer the second and/or third symbols. Similarly, the MIMO receiver may reliably detect the second symbol without being required to buffer the first and/or third symbols. The MIMO receiver may also reliably detect the third symbol without being required to buffer the second and/or third symbols.

A permutation matrix, $P[f_2]$, associated with a second carrier frequency, $f_2$, may be represented as in the following equation:

$$P[f_2] = \begin{bmatrix} 0 & 1 & 0 \\ 0 & 0 & 1 \\ 1 & 0 & 0 \end{bmatrix} \quad \text{equation [24]}$$

wherein the MIMO transmitter transmits a first symbol via the third spatial stream $s_3$, a second symbol via the first spatial stream $s_1$, and a third symbol via the second spatial stream $s_2$. The corresponding ordered plurality of spatial streams may be represented according to equations [21b] and [21c] in the following equation:

$$\hat{S}_R = \begin{bmatrix} s_2 \\ s_1 \\ s_3 \end{bmatrix} \quad \text{equation [25]}$$

In this case, the MIMO receiver may reliably detect the first symbol associated with the third spatial stream. After detecting the first symbol, the MIMO receiver may reliably detect the second symbol associated with the first spatial stream. After detecting the first and second symbols, the MIMO receiver may reliably detect the third symbol associated with the second spatial stream. Since the MIMO receiver may receive the first symbol, the second symbol, and the third symbol in an order according to the order of transmission, the MIMO receiver may reliably detect the first symbol without being required to buffer the second and/or third symbols. Similarly, the MIMO receiver may reliably detect the second symbol without being required to buffer the first and/or third symbols. The MIMO receiver may also reliably detect the third symbol without being required to buffer the second and/or third symbols.

A permutation matrix, $P[f_3]$, associated with a third carrier frequency, $f_3$, may be represented as in the following equation:

$$P[f_3] = \begin{bmatrix} 0 & 0 & 1 \\ 1 & 0 & 0 \\ 0 & 1 & 0 \end{bmatrix} \quad \text{equation [26]}$$

wherein the MIMO transmitter transmits a first symbol via the second spatial stream $s_2$, a second symbol via the third spatial stream $s_3$, and a third symbol via the first spatial stream $s_1$. The corresponding ordered plurality of spatial streams may be represented according to equations [21b] and [21c] in the following equation:

$$\hat{S}_R = \begin{bmatrix} s_1 \\ s_3 \\ s_2 \end{bmatrix} \quad \text{equation [27]}$$

In this case, the MIMO receiver may reliably detect the first symbol associated with the second spatial stream. After detecting the first symbol, the MIMO receiver may reliably detect the second symbol associated with the third spatial stream. After detecting the first and second symbols, the MIMO receiver may reliably detect the third symbol associated with the first spatial stream. Since the MIMO receiver may receive the first symbol, the second symbol, and the third symbol in an order according to the order of transmission, the MIMO receiver may reliably detect the first symbol without being required to buffer the second and/or third symbols. Similarly, the MIMO receiver may reliably detect the second symbol without being required to buffer the first and/or third symbols. The MIMO receiver may also reliably detect the third symbol without being required to buffer the second and/or third symbols.

Figure 4:
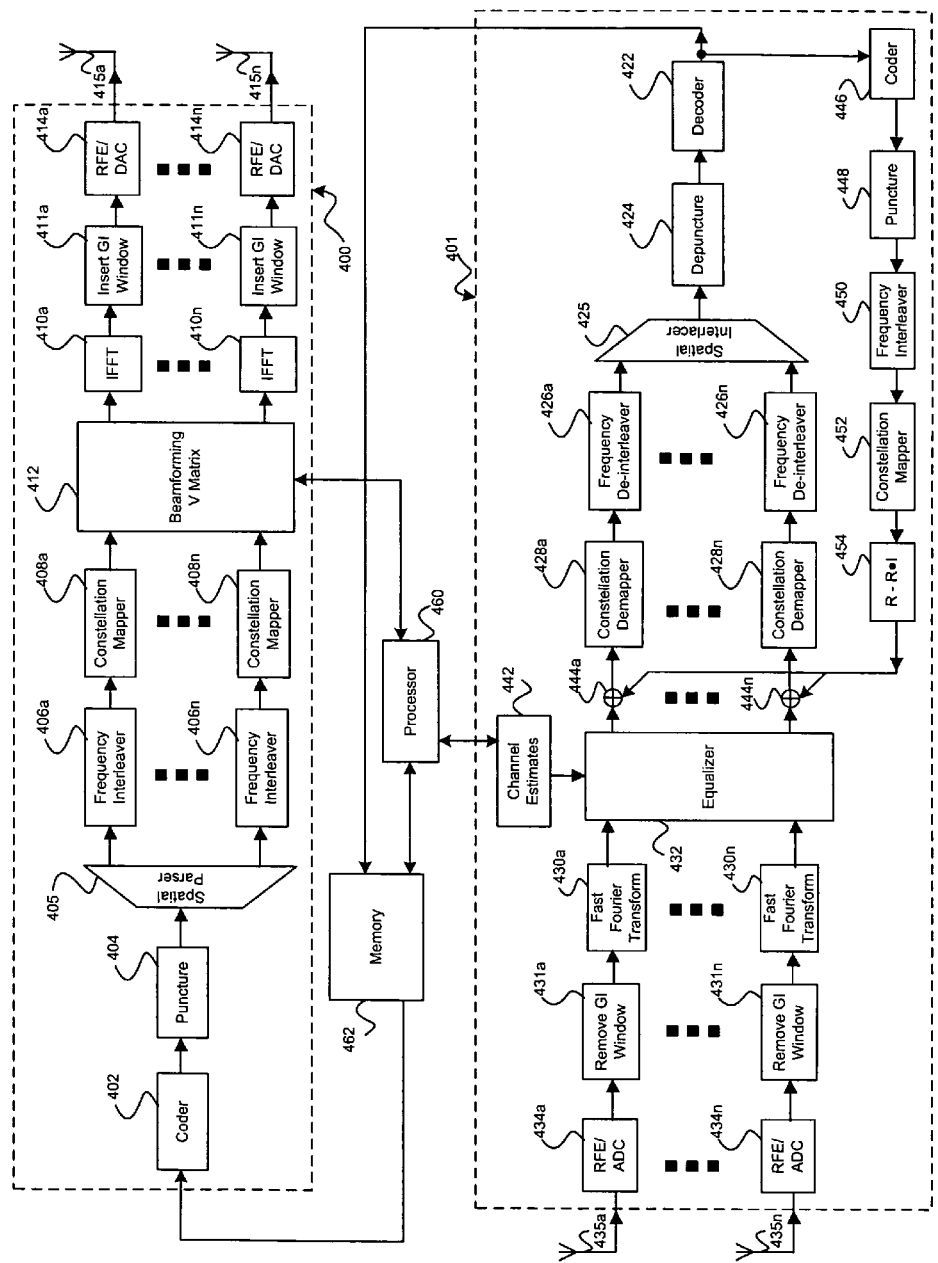
FIG. 4 is an exemplary functional block diagram of a transceiver comprising a transmitter and a receiver in an LST MIMO system, in accordance with an embodiment of the invention.

FIG. 4 is an exemplary block diagram of a transceiver comprising a transmitter and receiver in an LST MIMO system, in accordance with an embodiment of the invention. Referring to FIG. 4, there is shown a transmitter 400, a processor 460, a memory 462, a plurality of transmitting antennas 415a, . . . , 415n, a receiver 401, and a plurality of receiving antennas 435a, ..., 435n. The transmitter 400 may comprise a coder block 402, a puncture block 404, spatial parser block 405, a plurality of frequency interleaver blocks 406a, ..., 406n, a plurality of constellation mapper blocks 408a, ..., 408n, a beamforming V matrix block 412, a plurality of inverse fast Fourier transform (IFFT) blocks 410a, ..., 410n, a plurality of insert guard interval (GI) window blocks 411a, ..., 411n, and a plurality of radio front end with digital to analog conversion (RFE/DAC) blocks 414a, ..., 414n.

The receiver 401 may comprise a plurality of radio front end with analog to digital conversion (RFE/ADC) blocks 434a, ..., 434n, a plurality of remove GI window blocks 431a, ..., 431n, a plurality of fast Fourier transform (FFT) blocks 430a, ..., 430n, a channel estimates block 443, an equalizer block 432, a plurality of adder blocks 444a, ..., 444n, a plurality of constellation demapper blocks 428a, ..., 428n, a plurality of frequency de-interleaver blocks 426a, ..., 426n, a spatial interlacer block 425, a depuncture block 424, and a decoder block 422. The receiver 401 may further comprise a coder block 446, a puncture block 448, a frequency interleaver block 450, a mapper block 452, and a matrix subtraction block 454.

The transmitter 400 may comprise suitable logic, circuitry, and/or code that may enable the concurrent transmission of an ordered plurality of signals, substantially as shown for the transmitter 286. The receiver 401 may comprise suitable logic, circuitry, and/or code that may enable the concurrent reception of an ordered plurality of signals, substantially as shown for the receiver 284.

The coder block 402 may comprise suitable logic, circuitry, and/or code that may enable transformation of received binary input data blocks by applying a forward error correction (FEC) technique, for example, binary convolutional coding (BCC). The application of FEC techniques, also known as "channel coding", may improve the ability to successfully recover transmitted data at a receiver by appending redundant information to the input data prior to transmission via an RF channel. The ratio of the number of bits in the binary input data block to the number of bits in the transformed data block may be known as the "coding rate". The coding rate, R, may be specified using the notation $i_b/t_b$, where $t_b$ represents the total number of bits that comprise a coding group of bits, while $i_b$ represents the number of information bits that are contained in the group of bits $t_b$. Any number of bits $t_b - i_b$ may represent redundant bits that may enable the receiver 284 to detect and correct errors introduced during transmission of information from the transmitter 302 to the receiver 322 via a wireless communication medium 342, for example.

Increasing the number of redundant bits may enable greater capabilities at the receiver to detect and correct errors in received information bits. Increasing the number of redundant bits may increase the value of $t_b$ without increasing the number of information bits $i_b$, and correspondingly reduce the coding rate, R. The resulting lower coding rate, R, may be referred to as a "stronger" coding rate in comparison to a higher coding rate, R. The stronger coding rate may also correspond to a stronger error protection scheme. The stronger error protection scheme may correspondingly enable greater capabilities at the receiver to detect and correct errors in received information bits. Decreasing the number of redundant bits may decrease the value of $t_b$ without decreasing the number of information bits $i_b$, and correspondingly increase the coding rate, R. The resulting higher coding rate, R, may be referred to as a "weaker" coding rate in comparison to a lower coding rate, R.

The invention is not limited to BCC, and any one of a plurality of coding techniques, for example, Turbo coding, low density parity check (LDPC) coding, and/or various block coding techniques such as Reed-Solomon FEC may also be utilized.

The puncture block 404 may comprise suitable logic, circuitry, and/or code that may enable alteration of a coding rate for received encoded data by removing redundant bits from the received transformed binary input data blocks. For example, for each contiguous block of 4 bits of received data that is encoded based on an R=½ coding rate BCC, the received data may comprise 2 information bits, and 2 redundant bits. By removing 1 of the redundant bits in the group of 4 received bits, the puncture block 304 may alter the coding rate from R=½ to R=⅔, for example.

The spatial parser block 405 may comprise suitable logic, circuitry, and/or code that may enable a block of data bits associated with a single bit stream to be divided into a plurality of parsed blocks of data bits, each of which may be associated with a corresponding plurality of parsed bit streams. Each of the parsed bit streams may be referred to as a spatial stream. A spatial stream may comprise an identifiable block of bits that may be processed within a MIMO system.

The spatial parser block 405 may receive the block of data bits associated with the single bit stream, $b_{db}$, and generate a plurality of parsed bit streams, $b_{st}[i]$, where i may be an index identifying a specific parsed bit stream among the plurality of parsed bit streams. The range of values for the index i may be represented as follows:

$$1 \leq i \leq N_{SS} \qquad \text{equation [28]}$$

where $N_{SS}$ may represent a number of spatial streams, for example $N_{SS}=2$ may indicate a MIMO system that comprises 2 spatial streams.

Each of the parsed bit streams, $b_{st}[i]$, may comprise a portion of the bits contained in the single bit stream $b_{db}$. The single bit stream $b_{db}$ may comprise the plurality of bits collectively contained in the corresponding plurality of parsed bit streams $b_{st}[i]$.

Various embodiments of the invention may not be limited to a specific method for allocating bits from a single bit stream to a plurality of spatial streams. For example, given a block of $N_{TOT}$ bits received in a from a single bit stream, the spatial parser block 405 may assign about $N_{TOT}/N_{SS}$ bits to each of the plurality of $N_{SS}$ spatial streams. A first block of $N_{TOT}/N_{SS}$ bits from the bit stream $b_{db}$ may be assigned to spatial stream 1, a second block of $N_{TOT}/N_{SS}$ bits may be assigned to spatial stream 2, and an $N_{SS}^{th}$ block of $N_{TOT}/N_{SS}$ bits may be assigned to spatial stream $N_{SS}$, for example. Alternatively, a $k^{th}$ bit from the bit stream $b_{db}$, where k may represent an index for a bit in the block of data bits associated with the bit stream $b_{db}$, may be assigned to spatial stream i as indicated in the following equation, for example:

$$k_i = \text{floor}(k/N_{SS}) + k \bmod(N_{SS}) \qquad \text{equation [29]}$$

where $k_i$ may represent an index for a bit assigned to the $i^{th}$ spatial stream, floor(x) may represent an integer value that is not larger than the value x, and y mod(x) may represent the modulus x value for y.

The frequency interleaver block 406a may comprise suitable logic, circuitry, and/or code that may enable a rearrangement of an order of bits among a block of bits associated with a received spatial stream. The frequency interleaver block 406a may utilize a plurality of permutations when rearranging the order of bits among a block of bits associated with a received spatial stream. After rearrangement, the interleaved block of bits associated with the $i^{th}$ spatial stream, $b_{st}[i]^{int}$, may be divided into a plurality of sub-blocks, $b_{sub}[f_k]$, where the index $f_k$ may represent a frequency carrier. The frequency carrier may correspond to one of a plurality of frequency carriers that may be utilized to transmit a representation of the bits contained in the sub-block via a wireless communication medium, for example. The representation of the bits may be referred to as a symbol. Each sub-block, $b_{sub}[f]$, may comprise a portion of bits in the block $b_{st}[i]^{int}$. The block of bits $b_{st}[i]^{int}$ may comprise the plurality of bits collectively contained in the corresponding plurality of sub-blocks $b_{sub}[f_k]$ for the range of values for k associated with the corresponding RF channel.

The frequency interleaver block 406n may comprise suitable logic, circuitry, and/or code that may enable a rearrangement of an order of bits among a block of bits associated with a received spatial stream, substantially as described for the frequency interleaver block 406a. In various embodiments of the invention, the number of frequency interleaver blocks 406a . . . 406n may be equal to the number of spatial streams, $N_{SS}$, for example.

The constellation mapper block 408a may comprise suitable logic, circuitry, and/or code that may enable a mapping of received bits, associated with a spatial stream, to one or more symbols. The received bits may be encoded based on an FEC, for example, and may be referred to as coded bits. The constellation mapper block 408a may receive one or more coded bits, $b_{sym}[f_k]$, and generate the symbol, $sym[f_k]$, based on a modulation type associated with the spatial stream. The number of coded bits associated with $b_{sym}[f_k]$ may be determined based on the modulation type. The representation of the symbol, $sym[f_k]$, may be a complex quantity comprising in-phase (I) and quadrature (Q) components. Each symbol, $sym[f_k]$, associated with the one or more coded bits $b_{sym}[f_k]$ may be associated with a frequency carrier, $f_k$, where k may be an index that identifies a frequency associated with a $k^{th}$ frequency carrier, utilized for transmitting a representation of the symbol via the wireless communication medium.

Exemplary modulation types may comprise binary phase shift keying (BPSK), Quadra phase shift keying (QPSK), 16 level QAM (16 QAM), 64 level QAM (64 QAM), and 256 level QAM (256 QAM). For the BPSK modulation type, the number of coded bits associated with a symbol may be represented: $b_{sym}[f_k]=1$, for each frequency carrier $f_k$. For the QPSK modulation type, the number of coded bits associated with a symbol may be represented: $b_{sym}[f_k]=2$, for each frequency carrier $f_k$. For the 16 QAM modulation type, the number of coded bits associated with a symbol may be represented: $b_{sym}[f_k]=4$, for each frequency carrier $f_k$. For the 64 QAM modulation type, the number of coded bits associated with a symbol may be represented: $b_{sym}[f_k]=6$, for each frequency carrier $f_k$. For the 256 QAM modulation type, the number of coded bits associated with a symbol may be represented: $b_{sym}[f_k]=8$, for each frequency carrier $f_k$.

The spatial stream may comprise a plurality of frequency carriers, $N_{SD}$, for example a 20 MHz RF channel may comprise $N_{SD}=56$ frequency carriers, $f_{-28}, f_{-27}, \ldots, f_{-1}, f_1, \ldots, f_{27}$, and $f_{28}$, that may be utilized for transmitting coded bits, while a 40 MHz RF channel may comprise $N_{SD}=112$ frequency carriers, $f_{-56}, f_{-55}, \ldots, f_{-1}, f_1, \ldots, f_{55}$, and $f_{56}$, that may be utilized for transmitting coded bits. In a MIMO system, the symbols $sym[f_{-28}], sym[f_{-27}], \ldots, sym[f_{-1}], sym[f_1], \ldots, sym[f_{27}]$, and $sym[f_{28}]$, or $sym[f_{-56}], sym[f_{-55}], \ldots, sym[f_{-1}], sym[f_1], \ldots, sym[f_{55}]$, and $sym[f_{56}]$, may be collectively referred to as an orthogonal frequency division multiplexing (OFDM) symbol. The number of coded bits associated with an OFDM symbol, $N_{CBPS}=N_{SD}*b_{sym}[f_k]$.

The number of data bits associated with the OFDM symbol, $N_{DBPS}=R*N_{SD}*b_{sym}[f_k]$, where R may refer to the coding rate.

The constellation mapper block 408n may comprise suitable logic, circuitry, and/or code that may enable a mapping of received bits, associated with a spatial stream, to one or more symbols, substantially as described for the constellation mapper block 408a. In various embodiments of the invention, the number of constellation mapper blocks 408a . . . 408n may be equal to the number of spatial streams, $N_{SS}$, for example.

The beamforming V matrix block 412 may comprise suitable logic, circuitry, and/or code that may enable processing of a received plurality of spatial streams, and generation of a corresponding plurality of signals that may be simultaneously transmitted by a MIMO transmitter 302. A MIMO receiver 322 may receive the information contained in the plurality of spatial streams. Each of the generated corresponding plurality of signals may comprise at least one weighted sum of at least a portion of the received plurality of spatial streams. A weighted sum may be computed corresponding to each of the plurality of frequency carriers, $f_k$. The beamforming V matrix block 412 may generate the corresponding plurality of signals based on a beamforming matrix V. The beamforming V matrix may be substantially as described in equation [4].

The IFFT block 410a may comprise suitable logic, circuitry, and/or code that may be utilized to enable conversion of a frequency domain representation of a signal X[f] to a time domain representation X(t). The corresponding time domain signal may comprise a plurality of OFDM symbols. An OFDM symbol may be computed based on application of an IFFT algorithm to the frequency components associated with the corresponding signal X[f]. For example a 64 point IFFT algorithm may be utilized by the IFFT block 410a when processing a 20 MHz RF channel, while a 128 point IFFT algorithm may be utilized when processing a 40 MHz RF channel. An exemplary method for OFDM symbol computation may be found in clause 17.3.5.9 from the IEEE standard 802.11a-1999 (R 2003).

The time domain representation X(t) may comprise time domain representations for a plurality of signals, $x_j(t)$, that may be transmitted simultaneously by a MIMO transmitter 302 as shown in the following equation:

$$X(t) = \begin{bmatrix} x_{N_{TX}}(t) \\ x_{N_{TX}-1}(t) \\ \vdots \\ x_1(t) \end{bmatrix} \qquad \text{equation [30]}$$

where $N_{TX}$ may represent the number of transmitting antennas.

Each of the plurality of signals $x_j(t)$ may comprise a plurality of OFDM symbols associated with a $j^{th}$ signal among a plurality of $N_{TX}$ simultaneously transmitted signals from a MIMO transmitter 302. The OFDM symbols may be serially transmitted within the $j^{th}$ signal, $x_j(t)$, among a plurality of $N_{TX}$ simultaneously transmitted signals. Each OFDM symbol may span a time duration, $T_{SYM}$, referred to as a symbol interval, for example $T_{SYM}=4$ μs.

The IFFT block 410n may comprise suitable logic, circuitry, and/or code that may be utilized to enable conversion of a frequency domain representation of a signal X[f] to a time domain representation X(t), substantially as described for the IFFT block 410a. In various embodiments of the invention, the number of IFFT blocks 410a ... 410n may be equal to the number of generated signals $N_{TX}$, for example.

The insert GI window block 411a may comprise suitable logic, circuitry, and/or code that may be utilized to enable insertion of guard intervals in one of a plurality of signals $x_j(t)$ transmitted by a MIMO transmitter 302. The guard interval, $T_{GI}$, may represent a time interval between the end of a current OFDM symbol interval, and the beginning of a subsequent OFDM symbol interval. Subsequent to the end of a symbol interval associated with a current OFDM symbol there may be a guard interval time duration, $T_{GI}$, for example $T_{GI}$=0.8 μs. Following the guard interval time duration there may be a subsequent symbol interval corresponding to a subsequent OFDM symbol.

The insert GI window block 411n may comprise suitable logic, circuitry, and/or code that may be utilized to enable insertion of guard intervals in one of a plurality of signals $x_j(t)$ transmitted by a MIMO transmitter 302, substantially as described for the insert GI window block 411a. In various embodiments of the invention, the number of insert GI window blocks 411a ... 411n may be equal to the number of generated signals, $N_{TX}$, for example.

The RFE/ADC block 414a may comprise suitable, logic, circuitry, and/or code that may be utilized to enable generation of an analog RF signal from a received generated signal. The received generated signal may comprise I and Q components, for example. The RFE/ADC block 414a may receive a generated baseband signal that comprises a digital representation of information or data. The RFE/ADC block 414a may utilize the information to generate the analog RF signal, which may be characterized by an amplitude, phase, and/or frequency. The RFE/ADC block 414a may generate the analog RF signal by utilizing one or more of a plurality of RF carrier signals to modulate the received baseband signal. The modulated signal may be transmitted via the antenna 415a. The RFE/ADC block 414a may be utilized to enable generation of a 20 MHz RF channel signal, and/or of a 40 MHz RF channel signal, for example.

The RFE/ADC block 414n may comprise suitable, logic, circuitry, and/or code that may be utilized to enable generation of an analog RF signal from a received generated signal, substantially as described for the RFE/ADC block 414a. The modulated signal generated by the RFE/ADC block 314n may be transmitted via the antenna 415n. In various embodiments of the invention, the number of RFE/ADC blocks 414a ... 414n may be equal to the number of generated signals, $N_{TX}$, for example.

The RFE/DAC block 434a may comprise suitable, logic, circuitry, and/or code that may be utilized to enable conversion of a received analog RF signal to a baseband signal that comprises a digital representation of the information or data contained in the received analog RF signal. The analog RF signal may be received via the antenna 435a. The received analog RF signal may be characterized by an amplitude, phase, and/or frequency. The digital representation may comprise I and Q components, for example. The RFE/DAC block 434a may utilize one or more RF carrier signals to demodulate the received analog RF signal. The RFE/DAC block 434 may extract the baseband signal by utilizing a low pass filter and/or band pass filter to filter the demodulated signal. The RFE/DAC block 414a may be utilized to enable reception of a 20 MHz RF channel signal, and/or of a 40 MHz RF channel signal, for example.

The RFE/DAC block 434n may comprise suitable, logic, circuitry, and/or code that may be utilized to enable conversion of a received analog RF signal to a baseband signal, substantially as described for the RFE/DAC block 434a. The analog RF signal may be received via the antenna 435n. In various embodiments of the invention, for example, the number of RFE/DAC blocks 434a ... 434n may be equal to the number of received signals, $N_{RX}$.

The remove GI window block 431a may comprise suitable logic, circuitry, and/or code that may be utilized to enable removal of guard intervals from one of a plurality of signals received by a MIMO receiver 322. The guard interval, $T_{GI}$, may be substantially as described for the insert GI window block 411a.

The remove GI window block 431n may comprise suitable logic, circuitry, and/or code that may be utilized to enable removal of guard intervals from one of a plurality of signals received by a MIMO receiver 322, substantially as described for the remove GI window block 431a. In various embodiments of the invention, the number of remove GI window blocks 431a ... 431n may be equal to the number of received signals, $N_{RX}$, for example.

The FFT block 430a may comprise suitable logic, circuitry, and/or code that may be utilized to enable conversion of a time domain representation of a signal $X(t)$ to a time domain representation $X[f]$. The signals $X(t)$ and $X[f]$ may be substantially as described for the FFT block 410a. The FFT block 430 may utilize an FFT algorithm to transform a time domain representation of an OFDM symbol into a frequency domain representation comprising a plurality of symbols wherein each symbol is associated with a frequency carrier $f_k$. For example a 64 point FFT algorithm may be utilized by the FFT block 430a when processing a 20 MHz RF channel, while a 128 point FFT algorithm may be utilized when processing a 40 MHz RF channel.

The FFT block 430n may comprise suitable logic, circuitry, and/or code that may be utilized to enable conversion of a time domain representation of a signal $X(t)$ to a time domain representation $X[f]$, substantially as described for the FFT block 430a. In various embodiments of the invention, the number of FFT blocks 430a ... 430n may be equal to the number of received signals $N_{RX}$, for example.

The channel estimates block 442 may comprise suitable logic, circuitry, and/or code that may enable utilization of preamble information contained with a received signal to compute values associated with a channel estimate matrix H. The channel estimate matrix H may be substantially as described in equation [7]. The preamble may comprise determined information as specified in an applicable IEEE 802.11 standard. The MIMO transmitter 302 may transmit preamble information in each of an ordered plurality of concurrently transmitted signals. Upon receiving the corresponding ordered plurality of concurrently received signals, the MIMO receiver 322 may evaluate values associated with the preamble information, comparing those values with expected values. Based on the comparison, the channel estimates block 442 may compute values for coefficients, $h_{ij}$, associated with the channel estimate matrix H as in equation [7].

The equalizer block 432 may comprise suitable logic, circuitry, and/or code that may be utilized to compute estimated values for a plurality of computed stream vector, $\hat{Y}$. The computed signal vector $\hat{Y}$ may comprise a plurality of estimated signal values, $\hat{y}_i$, as in the following equation:

$$\hat{Y} = \begin{bmatrix} \hat{y}_1 \\ \hat{y}_2 \\ \vdots \\ \hat{y}_N \end{bmatrix} \quad \text{equation [31]}$$

The equalizer block 432 may utilize a computed channel estimate matrix H, as in equation [7], and/or perform QRV decomposition, as in equation [9], and/or GMD decomposition on the channel estimate matrix H. The equalizer block 432 may apply a matrix Q*, associated with the receive filter coefficient block 324, as shown in equation [14a], when computing the estimated values associated with the computed signal vector $\hat{Y}$.

The adder block 444a may comprise suitable logic, circuitry, and/or code that may enable binary addition and/or binary subtraction of corresponding digital representations of input signals to produce an output signal wherein the output signal comprises a binary representation of the addition and/or subtraction of the corresponding input signals. In various embodiments of the invention, the adder block 444a, may receive 2 input signals and produce an output signal wherein the output signal comprises a binary representation of the subtraction of the 2 input signals. In these various embodiments, one of the input signals may represent estimated values associated with an $i^{th}$ computed signal, $\hat{y}_i$, while the other input signal, $\hat{s}_{SIC(i)}$, which may be utilized for successive interference cancellation (SIC), may represent an estimated value associated with one or more of $(i-j)^{th}$ destination streams $\hat{s}_{i-j}$, where j may represent an index that is utilized to reference one or more destination streams. The output signal from the adder block 444a, $z_i$, may comprise a binary representation computed as in the following equation, for example:

$$z_i = \hat{y}_i - \hat{s}_{SIC(i)} \quad \text{equation [32]}$$

The adder block 444n may comprise suitable logic, circuitry, and/or code that may enable binary addition and/or binary subtraction of corresponding digital representations of input signals to produce an output signal, substantially as described for the adder block 444a. In various embodiments of the invention, the number of adder blocks 430a . . . 430n may be equal to the number of spatial streams $N_{SS}$, for example.

The constellation demapper block 428a may comprise suitable logic, circuitry, and/or code that may enable a conversion of a received symbol associated with a destination stream, to corresponding bits represented by the received symbol, based on a modulation type. The constellation demapper block 428a may receive a destination symbol d_sym[$f_k$] and determine a corresponding binary representation of bits c_$b_{sym}$[$f_k$], based on a modulation type associated with the destination stream. The representation of the destination symbol, d_sym[$f_k$], may be a complex quantity comprising I and Q components. The frequency carrier, $f_k$, where k may be an index that identifies a frequency associated with a $k^{th}$ frequency carrier, may be one of a plurality of frequency carriers associated with a corresponding RF channel. Exemplary modulation types and correspondence between a destination symbol, d_sym[$f_k$], and corresponding binary representation, c_$b_{sym}$[$f_k$], may be substantially as described for the frequency interleaver block 406a.

The constellation demapper block 428n may comprise suitable logic, circuitry, and/or code that may enable conversion of a received symbol associated with a destination stream, to corresponding bits represented by the received symbol, substantially as described for the constellation demapper block 428a. In various embodiments of the invention, the number of constellation demapper blocks 428a . . . 428n may be equal to the number of spatial streams, $N_{SS}$, for example.

The frequency deinterleaver block 426a may comprise suitable logic, circuitry, and/or code that may enable a rearrangement of an order of bits among a block of bits associated with a received destination stream. The frequency deinterleaver block 426a may utilize a plurality of permutations when rearranging the order of bits among a block of bits associated with a received destination stream. The frequency deinterleaver block 426a may receive bits from a plurality of sub-blocks c_$b_{sub}$[$f_k$], rearranging the bits from the various sub-blocks to form a corresponding block of bits associated with the $i^{th}$ destination stream, c_$b_{st}$[i]$^{int}$, where the index $f_k$ may represent a frequency carrier. The block of bits c_$b_{st}$[i]$^{int}$ may comprise the plurality of bits collectively contained in the corresponding plurality of sub-blocks c_$b_{sub}$[$f_k$] for the range of values for k associated with the corresponding RF channel.

The frequency deinterleaver block 426n may comprise suitable logic, circuitry, and/or code that may enable a rearrangement of an order of bits among a block of bits associated with a received destination stream, substantially as described for the frequency deinterleaver block 426a. In various embodiments of the invention, the number of frequency deinterleaver blocks 426a . . . 426n may be equal to the number of spatial streams, $N_{SS}$, for example.

The spatial interlacer block 425 may comprise suitable logic, circuitry, and/or code that may enable a plurality of parsed blocks of data bits, each of which may be associated with a corresponding plurality of parsed bit streams, to be merged into a single block of data bits associated with a single bit stream. Each of the parsed bit streams may be associated with a destination stream.

The spatial interlacer block 425 may receive a plurality of parsed bit streams c_$b_{st}$[i], where i may be an index identifying a specific parsed bit stream among the plurality of parsed bit streams. The range of values for the index i may be as described in equation [28]. The plurality of parsed bit streams may be merged to form the corresponding single bit stream c_$b_{db}$. The single bit stream c_$b_{db}$ may comprise the plurality of bits collectively contained in the corresponding plurality of parsed bit streams c_$b_{st}$[i].

Various embodiments of the invention may not be limited to a specific method for combining bits from a plurality of destination streams to form a single bit stream. For example, given a block of $N_{TOT}$ bits received in a from a single bit stream, the spatial interleaver block 425 may retrieve a block of about $N_{TOT}/N_{SS}$ bits from each of the plurality of $N_{SS}$ destination streams. A first block of $N_{TOT}/N_{SS}$ bits may be retrieved from the parsed bit stream c_$b_{st}$[1], a second block of $N_{TOT}/N_{SS}$ bits may be retrieved from the parsed bit stream c_$b_{st}$[2], and an $N_{SS}^{th}$ block of $N_{TOT}/N_{SS}$ bits may be retrieved from the parsed bit stream c_$b_{st}$[$N_{SS}$], for example.

The depuncture block 424 may comprise suitable logic, circuitry, and/or code that may enable the insertion of null bits into a received block of data bits. The insertion of null bits may be used to adjust a coding rate associated with coded data contained in the received block of data bits. The adjusted coding rate may represent a determined coding rate, for example, R=½. For example, if the coding rate associated with the received block of data bits is R=¾, the depuncture block 424 may insert 2 null bits into each block of 4 bits from the received block of data bits to produce a depunctured data block comprising 6 bits wherein the coding rate may be R=½.

The decoder block 422 may comprise suitable logic, circuitry, and/or code that may enable the retrieval of an unencoded binary data from an encoded block of binary data. The decoder block 422 may utilize, for example, FEC to detect and/or correct errors in the received encoded block of binary data. The detection and/or correction of error in the received encoded block of binary data may enable a receiver 322 to receive a block of binary data, which corresponds to a block of binary data that was transmitted by a transmitter 302 via a wireless communication medium 342.

Various embodiments of the invention may utilize any of a plurality of FEC methods, for example, decoding based on BCC or LDPC, Turbo decoding, and/or various block decoding techniques such as Reed-Solomon FEC.

The matrix subtraction block 454 may comprise suitable logic, circuitry, and/or code that may enable computation of an SIC vector, $\hat{s}_{SIC}$, comprising a plurality of SIC input signals, $\hat{s}_{SIC(i)}$, as shown in equation [32]. The vector may be computed based on estimated values associated with an ordered plurality of destination streams and/or with a reordered plurality of destination streams.

The matrix subtraction block 454 may utilize an upper triangular, or lower triangular matrix R, such as shown in equation [15]. The matrix subtraction block 454 may compute a matrix, diag(R), which comprises diagonal matrix elements from the matrix R by computing a Hadamard product, R•I, based on the matrix R, and a corresponding identity matrix I, where the symbol "•" may represent the Hadamard product operation. The matrix subtraction block 454 may compute a residual matrix, $R_{RES}$, by subtracting the matrix formed by the Hadamard product from the matrix R as in the following equation:

$$R_{RES} = R - R \bullet I \quad \text{equation [33]}$$

The matrix subtraction block 454 may compute the SIC vector $\hat{s}_{SIC}$ by computing a multiplicative product of the residual matrix, and a vector representing estimated values associated with an ordered plurality of destination streams $\hat{s}_R$, or with a reordered plurality of destination streams $\tilde{s}_R$.

The coder 446 may be substantially as described for the coder 402. The puncture block 448 may be substantially as described for the puncture block 404. The frequency interleaver block 450 may be substantially as described for the frequency interleaver block 406a. The constellation mapper block 452 may be substantially as described for the constellation mapper block 408a.

The processor 460 may comprise suitable logic, circuitry, and/or code that may enable the computation of values corresponding to beamforming factors, $v_{ij}[f_k]$, based on frequency carrier, $f_k$, as shown in equation [4]. The processor 460 may enable the computation of values corresponding the channel estimate matrix H, as shown in equation [7]. The processor 460 may enable the equalizer 432 to select a decomposition method, and/or to perform a selected decomposition method when computing estimated values corresponding to at least a portion of the plurality of destination streams. The processor 460 may enable the equalizer 432 to compute one or more permutation matrices, P, as in equation [17], which may enable the receiver 401 to perform reordered QRV-LST detection, in accordance with various embodiments of the invention.

The processor 460 may also enable the transmitter 400 to perform transmitter functions in accordance with applicable communications standards. The processor 460 may also enable the receiver 401 to perform receiver functions in accordance with applicable communications standards. These functions may comprise, but are not limited to, tasks performed at lower layers, for example physical layer (PHY) and medium access control (MAC) layer functions, in a relevant protocol reference model. These tasks may comprise physical layer functions, such as physical layer convergence protocol (PLCP), physical medium dependent (PMD), and/or associated layer management functions, for example.

The processor 460 may also enable generation of source information bits and/or retrieval of stored source information bits that may be subsequently, coded, mapped, and transmitted via a wireless medium, for example. The processor 460 may also enable reception of information bits and/or processing of the received information bits. The processing information bits may be stored, and subsequently utilized by applications programs executing, at least in part, on the processor 460. The stored and/or processed information may be subsequently coded, mapped, and transmitted via the wireless communications medium, for example.

The memory 462 may comprise suitable logic, circuitry, and/or code that may be utilized to enable storage and/or retrieval of information and/or a representation of the information, for example a binary representation comprising bits. The memory 462 may enable storage of source information bits. The stored source information bits may be assigned physical resources within the memory 462 for the storage. The stored source information bits may be subsequently available for retrieval. Retrieved source information bits may be output by the memory 462 and communicated to other devices, components, and/or subsystems that may be communicatively coupled, directly and/or indirectly, to the memory 462. The memory 462 may enable the stored source information bits to remain stored and/or available for subsequent retrieval until the resources allocated for the storage are deallocated. Physical resources may be deallocated based on a received instruction that the stored source information bits be erased from the memory 462, or based on a received instruction that the physical resources be allocated for the storage of subsequent binary information. The memory 462 may utilize a plurality of storage medium technologies such as volatile memory, for example random access memory (RAM), and/or nonvolatile memory, for example electrically erasable programmable read only memory (EEPROM).

In operation for the transmitter 400, the processor 460 may enable computation of a set of beamforming factors that may be utilized by the beamforming V matrix 412 to concurrently generate an ordered plurality of signals. The beamforming factors may be utilized to generate each of the ordered plurality of signals by combining at least a portion of a plurality of spatial streams. The processor 460 may communicate instructions to the memory 462 causing the memory 462 to retrieve stored source information bits. The retrieved source information bits may be communicated to the coder block 402. The coder block 402 may utilize BCC to generate coded information bits based on a determined coding rate. The puncture block 404 may receive a block of bits comprising the coded information bits. The puncture block 404 may modify the coding rate utilized for the block of bits, for example, to implement a weaker coding rate. The spatial parser 405 may parse the block of bits to distribute a portion of the block of bits to each of a plurality of $N_{SS}$ spatial streams, for example $N_{SS}=3$ may refer to a plurality of 3 spatial streams.

The frequency interleaver 406a for each of the plurality of spatial streams may rearrange the order of bits in a spatial stream. The rearranged bits may be sorted by frequency carrier, wherein the collective plurality of frequency carriers may be associated with an RF channel utilized for transmitting the information via the wireless communications medium 342. The corresponding constellation mapper 408a may group the sorted bits to form one or more symbols for each of the corresponding frequency carriers. The collective set of concurrently formed symbols, for the plurality of frequency carriers, may be referred to as an OFDM symbol.

The beamforming V matrix 412 may concurrently generate an ordered plurality of signals by combining symbols associated with at least a portion of the plurality of spatial streams, based on the beamforming factors. Each of the ordered plurality of concurrently generated signals may be a baseband signals that comprises a digital representation of information contained within the plurality of symbols combined to form the concurrently generated signal. Values associated with the beamforming factors may vary according to spatial stream, generated signal, and/or frequency carrier. The number of concurrently generated signals may correspond to the number of transmitting antennas 415a, ..., 415n, $N_{TX}$. For example $N_{TX}$=3 may refer to a plurality of 3 concurrently generated signals.

For each of the ordered plurality of concurrently generated signals, an IFFT block 410a may transform a frequency domain representation of the generated signal to a corresponding time domain representation. The corresponding insert GI window block 411a may insert a time interval between successive OFDM symbols transmitted via the corresponding generated signal. The RFE/DAC block 414a may convert the digital representation for the generated signal to an analog representation. The plurality of RFE/DAC blocks 414a, . . . 414n may modulate a corresponding generated signal in accordance with an RF channel, which may be utilized to transmit the information contained in the ordered plurality of concurrently generated signals via a wireless communication medium.

For the receiver 401, the processor 460 may enable computation of values associated with the channel estimate matrix H that may be utilized by the channel estimates block 442. The values may be utilized by the equalizer block 432 to compute estimated values for symbols contained within an ordered plurality of destination streams based on a concurrently received plurality of signals.

The plurality of RFE/ADC blocks 434a, ..., 434n may concurrently receive an ordered plurality of analog RF signals via the corresponding plurality of receiving antennas 435a, ..., 435n. The number of concurrently received signals may correspond to the number of receiving antennas 435a, ..., 435n, $N_{RX}$. For example $N_{RX}$=3 may refer to a plurality of 3 concurrently received signals. Each RFE/ADC block 434a may convert one of the concurrently received analog RF signals to a baseband signal that comprises a digital representation of information contained within the corresponding analog RF signal. The RFE/ADC block 434a may demodulate the RF signal to a baseband signal prior to performing analog to digital conversion of the information. Each baseband signal may comprise a plurality of OFDM symbols wherein each OFDM symbol may be separated by a time interval. The corresponding remove GI window block 431a may remove the time interval, which separates successive OFDM symbols in each received baseband signal.

For each of the received baseband signals, a corresponding FFT block 430a may transform a time domain representation of the OFDM symbol contained within the baseband signal to a frequency domain representation. The frequency domain representation may comprise a plurality of symbols wherein each symbol may be associated with a frequency carriers associated with an RF channel utilized for communicating the received OFDM symbol via the wireless communication channel. Each symbol may comprise at least a portion of the information contained within the OFDM symbol.

The equalizer block 432 may utilize the channel estimate matrix H, further performing decomposition on the matrix H, for example, based on a QRV decomposition and/or GMD. The equalizer block 432 utilize an ordered plurality of concurrently received signals, the matrix H, a decomposed version of the matrix H, and/or a permutation matrix P, to compute estimated values for an ordered plurality of destination streams, and/or a reordered plurality of destination streams. The number of destination streams at the receiver 401 may correspond to the number of spatial streams at the transmitter 400.

In the receiver 401, a feedback loop may be defined by the plurality of adder blocks 444a, . . . , 444n, the plurality of constellation demapper blocks 428a, . . . , 428n, the plurality of frequency de-interleaver blocks 426a, . . . , 426n, the spatial interlacer 425, the depuncture block 424, the decoder 422, the coder 446, the puncture block 448, the frequency interleaver 450, the mapper 452, and the matrix subtraction block 454. In various embodiments of the invention, the feedback loop may enable reliable detection of estimated values for symbols associated with each of the plurality of destinations streams based on QRV-LST detection. In various embodiments of the invention, the reliable detection of estimated values for the symbols may be performed without requiring buffering of previously received symbols from other destination streams based on utilization of the permutation matrix P.

Each of the constellation demapper blocks 428a may receive bits associated with a plurality of symbols associated with an OFDM symbol for a corresponding destination stream. The symbols may correspond to associated with one of a plurality of frequency carriers associated with the RF channel. The constellation demapper block 428 may generate a group of bits corresponding to each symbol. The bits may be sorted in the destination stream in an order according to frequency carrier. A corresponding frequency de-interleaver 426a may rearrange the order of bits in the corresponding destination stream.

The spatial interleaver 425 may merge bits from the ordered plurality of destination streams to form a single bit stream. The spatial interleaver 425 may, for example, select a current block of bits from a current destination stream. The number of bits in the current block may correspond to a number of bits contained in a symbol for the corresponding destination stream. The spatial interleaver 425 may output the selected current block of bits to the single bit stream. The spatial interleaver 425 may select a subsequent block of bits from a subsequent destination stream. The spatial interleaver 425 may output the selected subsequent block of bits to the single bit stream. The order in which bits may be output from the spatial interleaver 425 from various destination streams may be determined based on the order in which corresponding bits were transmitted by the transmitter 400. The order in which the corresponding bits were transmitted by the transmitter 400 may be determined based on the spatial parser 405 and/or the plurality of frequency interleaver blocks 406a, . . . , 406n.

The spatial interleaver 425 may output bits from the plurality of destination streams in an order that varies according to the frequency carrier associated with the bits. For example, for a first frequency carrier, the spatial interleaver 425 may output bits from a first destination stream, followed by bits from a second destination stream, followed by bits from a third destination stream. For a second frequency carrier, the spatial interleaver 425 may output bits from the third destination stream, followed by bits from the first destination stream, followed by bits from the second destination stream. For a third frequency carrier, the spatial interleaver 425 may output bits from the second destination stream, followed by bits from the third destination stream, followed by bits from the first destination stream.

The depuncture block 424 may receive the single bit stream from the spatial interleaver 425. The depuncture block 424 may insert null bits to modify the coding rate associated with the blocks of bits contained within the single bit stream. The decoder block 422 may decode the bits within the single bit stream to extract unencoded information. The decoder block 422 may utilized FEC to detect and/or correct bit errors in the single bit stream. A bit error may be detected an analysis of the FEC indicates that a detected value for a bit is a different value than is expected. The bit error may be corrected by modifying the detected bit value to correspond to the expected value. The decoder block 422, for example a Viterbi decoder, may utilize soft information to derive statistical estimates for values associated with the unencoded information.

The decoder block 422 may detect bit values in an order according to the order in which the bits were merged into the single bit stream by the spatial interlacer 425. Consequently, the decoder block 422 may serially detect bit values associated with symbols according to each of the corresponding plurality of frequency carriers.

In an LST system, the decoder block 422 may output a detected symbol to the feedback path represented by the coder 446, puncture block 448, frequency interleaver 450, mapper 452, and matrix subtraction block 454. The output of the matrix subtraction block 454 may be input to the plurality of adder blocks 444a, ..., 444n.

The feedback loop may enable a current detected symbol to be utilized to detect a subsequent symbol for each of the plurality of destination streams. In a system for reliable QRV-LST detection, a symbol may be reliably detected if it is received in a destination stream without interference from other symbols, or if estimated values for the interference symbols have been reliably computed.

In various embodiments of the invention, the plurality of adder blocks 444a, ..., 444n may be utilized to compute an estimated value for a symbol associated with an $i^{th}$ one of a reordered plurality of N destination streams, $\tilde{s}_i$, may be computed according to the following equation:

$$\tilde{s}_i = \frac{1}{r_{(N-i+1)(N-i+1)}} \left( \hat{y}_{N-i+1} - \sum_{j=N-i+2}^{N} r_{(N-i+1)j} \tilde{s}_{N-j+1} \right) \quad \text{equation [34a]}$$

where $r_{(i)(j)}$ may refer to a matrix element from the $i^{th}$ row and $j^{th}$ column from the matrix R as shown in equation [15], for example, j may represent an index corresponding to estimated values for previously detected symbols associated with corresponding destination streams $\tilde{s}_{N-j+1}$, and $\hat{y}_{N-i+1}$ may refer to an estimated value for one of a plurality of signals computed by the equalizer block 432 as shown in equation [31].

In equation [34a], an estimated value for a symbol associated with the first spatial stream, $\tilde{s}_1$, may be detected reliably first among the reordered plurality of destination streams $\tilde{S}_R$ as in the following equation:

$$\tilde{s}_1 = \frac{1}{r_{NN}} \hat{y}_N \quad \text{equation [34b]}$$

An estimated value for a symbol associated with the second spatial stream, $\tilde{s}_2$, may be detected reliably subsequent to detection from the first spatial stream as in the following equation:

$$\tilde{s}_2 = \frac{1}{r_{(N-1)(N-1)}} (\hat{y}_{N-1} - r_{(N-1)N} \tilde{s}_1) \quad \text{equation [34c]}$$

In various embodiments of the invention, estimated values for a plurality of symbols associated with the ordered plurality of destination streams, $\hat{S}_R$, may be computed based on the corresponding reordered plurality of destination streams $\tilde{S}_R$ based on equations [21b] and [21c], for example.

Various embodiments of the invention may utilize the permutation matrix P to enable a receiver 401 to reliably detect symbols in an ordered plurality of destination streams in response to changes in the order in which bits may be transmitted by the transmitter 400 as a result of the operation of the spatial parser 405 and/or plurality of frequency interleavers 406a, ..., 406n.

Figure 5:
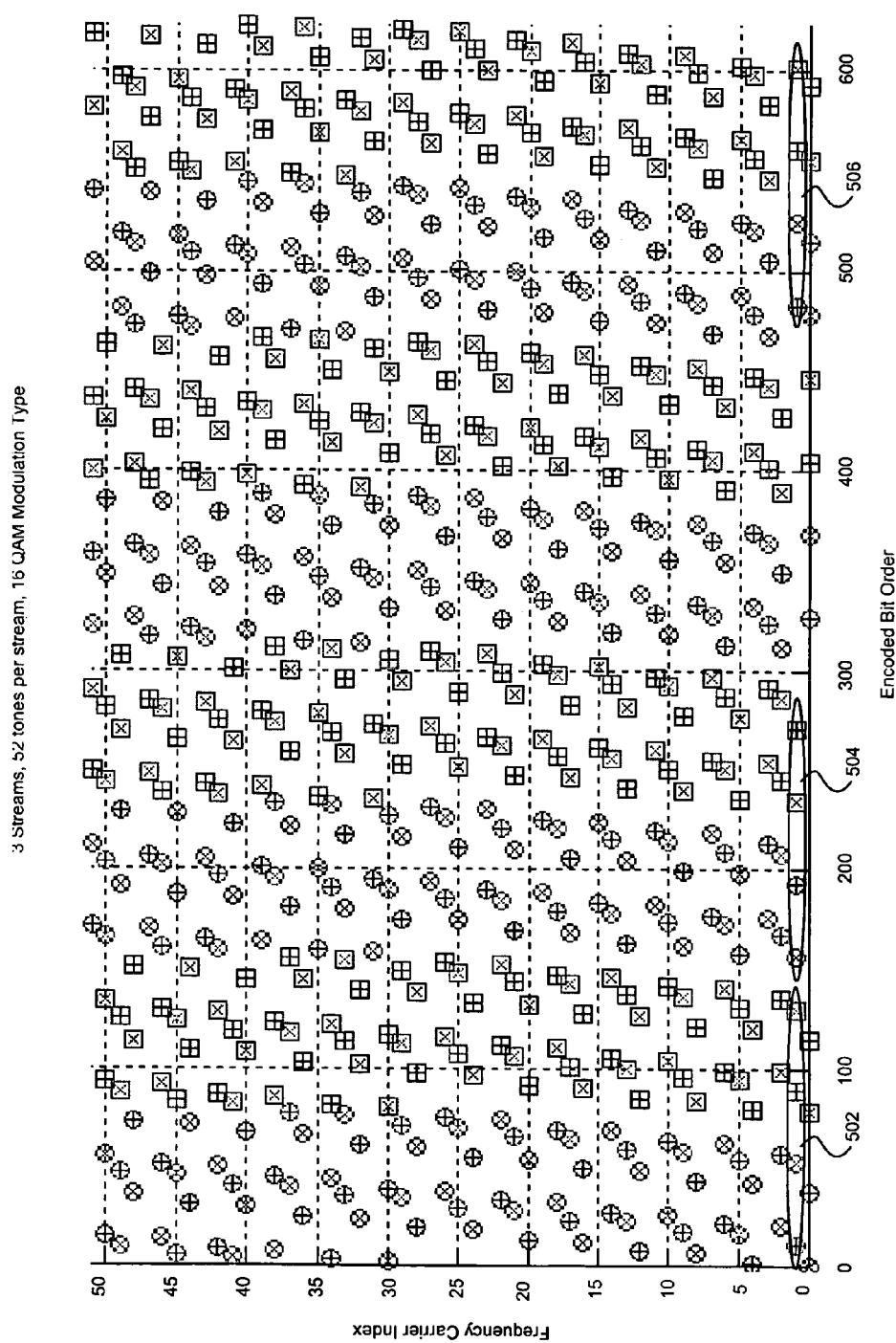
FIG. 5 illustrates an exemplary order for transmitted bits from a MIMO transmitter for each of a plurality of frequency carriers, which may be utilized in connection with an embodiment of the invention.

FIG. 5 illustrates an exemplary order for transmitted bits from a MIMO transmitter for each of a plurality of frequency carriers, which may be utilized in connection with an embodiment of the invention. Referring to FIG. 5, there is a first symbol 502, a second symbol 504, and a third symbol 506. FIG. 5 shows an order in which a MIMO transmitter may transmit bits for each of a plurality of frequency carriers associated with a 20 MHz RF channel wherein the RF channel may comprise 52 frequency carriers, or tones, for example. The vertical axis represents the frequency carrier index, k. The horizontal axis shows an encoded bit order in units of time. For a given frequency carrier, bits indicated from left to right may be encoded and transmitted at successive time instants. In FIG. 5, the MIMO transmitter may utilize 3 spatial streams. The exemplary modulation type utilized in FIG. 5 is 16 QAM.

The first symbol 502 may comprise 4 bits, each transmitted at individual successive time instants. The first symbol 502 may be transmitted first for a frequency carrier index k=1. The second symbol 504 may be transmitted second for the frequency carrier index k=1, and the third symbol 506 may be transmitted third for the frequency carrier index k=1. The first symbol 502 may be associated with a third spatial stream, the second symbol 504 may be associated with a first spatial stream, and a third symbol 506 may be associated with a second spatial stream.

In some conventional LST MIMO receivers, the first symbol 502 may not be reliably detected until the second symbol 504, and the third symbol 506, has been detected. Consequently, the first symbol 502 may be buffered until the second symbol 504, and the third symbol 506, has been reliably detected. This, however, may require that the first symbol 502 be buffered for a time duration of approximately 600 time units.

In various embodiments of the invention, the first symbol 502 may be reliably detected first, the second symbol 504 may be reliably detected second, and the third symbol 506 may be reliably detected third. The order of detection at the MIMO receiver may correspond to the order in which the symbols were transmitted at the MIMO transmitter.

Various embodiments of the invention may enable reliable detection of estimated values for symbols associated with the reordered plurality of destination streams at a MIMO receiver. The permutation matrix may be utilized to reconstruct the ordered plurality of destination streams based on the permutation matrix, P. Estimated values for symbols associated with the ordered plurality of destination streams at the receiver may comprise estimates for corresponding symbols associated with the ordered plurality of spatial streams at the transmitter 400. In one aspect of the invention, the ordered plurality of destination streams may be equivalent to the ordered plurality of spatial streams. In another aspect of the invention, the reordered plurality of destination streams may be equivalent to a reordered plurality of spatial streams. Received information bits may be assembled in order at the MIMO receiver based on the ordered plurality of destination streams. The received information bits may be stored in memory 462, and/or processed by a processor 460, for example.

Figure 6:
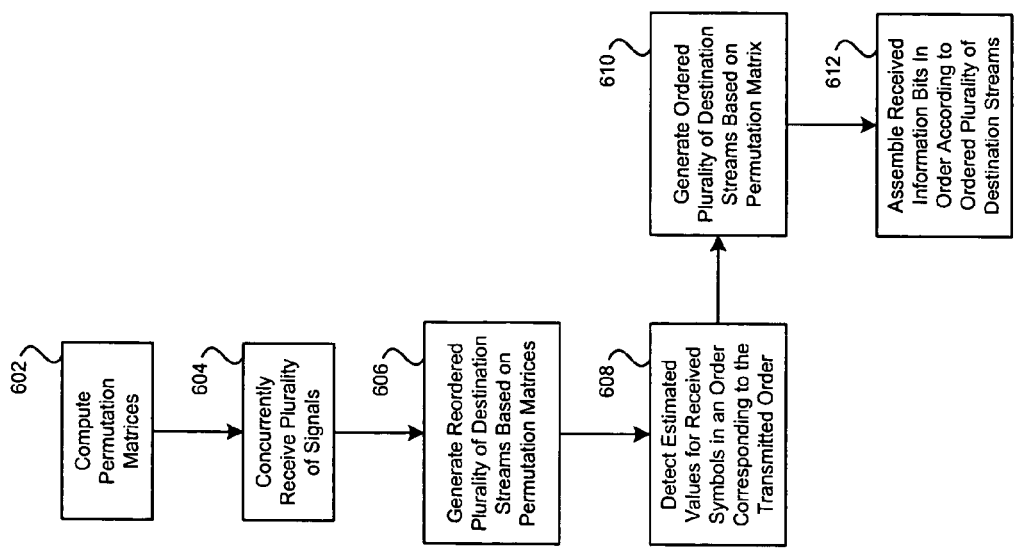
FIG. 6 is a flowchart illustrating exemplary steps for reordered QRV-LST detection for efficient processing for MIMO communication systems, in accordance with an embodiment of the invention.

FIG. 6 is a flowchart illustrating exemplary steps for QRV-LST detection, in accordance with an embodiment of the invention. Referring to FIG. 6, in step 602 one or more permutation matrices, P, may be computed. In step 604, the receiver 401 may concurrently receive a plurality of signals via a wireless communications medium. In step 606, the receiver 401 may generate a reordered plurality of destination streams based on the computed permutation matrices. In step 608, the receiver 401 may detect estimated values for received symbols in an order corresponding to the order in which the symbols were transmitted. In step 610, the receiver 401 may generate an ordered plurality of destination streams based on the permutation matrix. In step 612, the receiver may assemble received information bits in order based on the ordered plurality of destination streams.

Aspects of a system for QRV-LST detection for efficient processing for MIMO communication systems may comprise a receiver 401 that enables reception of an ordered plurality of signals, wherein each of the ordered plurality of signals may comprise information contained in an ordered plurality of spatial streams. Each spatial stream may comprise one or more frequency carriers. The receiver 401 may enable detection of estimated values for a portion of the information contained in a corresponding one of the ordered plurality of spatial streams in an order based on the one or more frequency carriers.

The receiver 401 may enable detection of the estimated values, in a specified order, for the portion of information in a current one of the ordered plurality of spatial streams, and a preceding portion of the information contained in a preceding one of the ordered plurality of spatial streams and/or a subsequent portion of the information contained in a subsequent one of the ordered plurality of spatial streams. The specified order may be determined for each of the one or more frequency carriers.

The receiver 401 may enable detection of the estimated values for information based on a channel estimate matrix, a beamforming matrix, and/or a permutation matrix. For each of the one or more frequency carriers, the receiver 401 may enable determination of corresponding values associated with the channel estimate matrix, the beamforming matrix and/or the permutation matrix. Each of the one or more frequency carriers may be associated with an RF channel utilized for receiving the ordered plurality of received signals. The channel estimate matrix may be computed based on an upper triangular matrix, and/or a lower triangular matrix. The values for diagonal matrix elements may be approximately equal for the upper triangular matrix and/or lower triangular matrix.

The receiver 401 may enable computation of an estimated value for a portion of information associated with an $i^{th}$ one of a reordered plurality of spatial streams by computing a difference between: an estimated value associated with an $(N-i+1)^{th}$ one of the plurality of received signals, and a sum comprising $(i-1)$ number of multiplicative products. Each of the multiplicative products may comprise: an $(N-j+1)^{th}$ one of the reordered plurality of spatial streams, and an $(N-i+1)^{th}$ matrix element in a $j^{th}$ row of the upper triangular, matrix and/or lower triangular, matrix. The computed difference may be divided by a value for a diagonal matrix element in an $(N-i+1)^{th}$ row of the upper triangular matrix, and/or lower triangular matrix. The variable N may represent a number of spatial streams contained in the reordered plurality of spatial streams, and i and j may represent indexes, each comprising a range of values from at least 1, to no greater than N. The receiver 401 may enable determination of the reordered plurality of spatial streams by multiplying the ordered plurality of spatial streams with a transposed version of the permutation matrix.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:

receiving in a transceiver, an ordered plurality of signals wherein each of said ordered plurality of received signals comprises information contained in an ordered plurality of spatial streams, each one of said ordered plurality of spatial streams comprising at least one frequency carrier;

detecting in said transceiver, estimated values for a portion of said information contained in a corresponding one of said ordered plurality of spatial streams in an order based on said at least one frequency carrier, using a quantization for reordered (QRV) decomposition matrix; and detecting said estimated values for said portion of said information in a current one of said ordered plurality of spatial streams and one or both of: a preceding portion of said information contained in a preceding one of said ordered plurality of spatial streams, and a subsequent portion of said information contained in a subsequent one of said ordered plurality of spatial streams, in a specified order.

2. The method according to claim 1, wherein said specified order is determined for each of said at least one frequency carrier.

3. The method according to claim 1, comprising detecting said estimated values for said information based on one or more of: a channel estimate matrix, a beamforming matrix, and a permutation matrix.

4. The method according to claim 3, comprising determining, for each of said at least one frequency carrier, corresponding values associated with said one or more of: said channel estimate matrix, said beamforming matrix, and said permutation matrix.

5. The method according to claim 4, wherein said each of said at least one frequency carrier is associated with an RF channel utilized for receiving said ordered plurality of received signals.

6. The method according to claim 4, wherein said channel estimate matrix is computed based on one or both of: an upper diagonal matrix, and a lower diagonal matrix.

7. The method according to claim 6, wherein said one or both of: said upper diagonal matrix, and said lower diagonal matrix, comprise diagonal terms whose corresponding values are about equal.

8. The method according to claim 6, comprising computing an estimated value for a portion of information associated with an ith one of a reordered plurality of spatial streams by computing a difference between:
an estimated value associated with an $(N-i+1)$th one of said plurality of received signals; and
a sum comprising $(i-1)$ number of multiplicative products wherein each said multiplicative product comprises:
an $(N-j+1)$th one of said reordered plurality of spatial streams; and
an $(N-i+1)$th matrix element in a jth row of said one or both of: said upper diagonal matrix and said lower diagonal matrix;
and dividing said computed difference by a value for a diagonal matrix element in an $(N-i+1)$th row of said one or both of: said upper diagonal matrix, and said lower diagonal matrix;
wherein N is a variable that represents a number of spatial streams contained in said reordered plurality of spatial streams, and i and j are indexes, each comprising a range of values from at least 1, to no greater than N.

9. The method according to claim 8, comprising determining said reordered plurality of spatial streams by multiplying said ordered plurality of spatial streams and a transposed version of said permutation matrix.

10. The method according to claim 1, wherein said QRV decomposition matrix comprises geometric mean decomposition matrix (GMD) elements.

11. A system for processing signals in a communication system, the system comprising:
circuitry that enables reception of an ordered plurality of signals wherein each of said ordered plurality of received signals comprises information contained in an ordered plurality of spatial streams, each one of said ordered plurality of spatial streams comprising at least one frequency carrier;
said circuitry enables detection of estimated values for a portion of said information contained in a corresponding one of said ordered plurality of spatial streams in an order based on said at least one frequency carrier, wherein said detection utilizes a quantization for reordered (QRV) decomposition matrix; and
said circuitry enables detection of said estimated values for said portion of said information in a current one of said ordered plurality of spatial streams and one or both of: a preceding portion of said information contained in a preceding one of said ordered plurality of spatial streams, and a subsequent portion of said information contained in a subsequent one of said ordered plurality of spatial streams, in a specified order.

12. The system according to claim 11, wherein said specified order is determined for each of said at least one frequency carrier.

13. The system according to claim 11, wherein said circuitry enables detection of said estimated values for said information based on one or more of: a channel estimate matrix, a beamforming matrix, and a permutation matrix.

14. The system according to claim 13, wherein said circuitry enables determination of, for each of said at least one frequency carrier, corresponding values associated with said one or more of: said channel estimate matrix, said beamforming matrix, and said permutation matrix.

15. The system according to claim 14, wherein said each of said at least one frequency carrier is associated with an RF channel utilized for receiving said ordered plurality of received signals.

16. The system according to claim 14, wherein said channel estimate matrix is computed based on one or both of: an upper diagonal matrix, and a lower diagonal matrix.

17. The system according to claim 16, wherein said one or both of: said upper diagonal matrix, and said lower diagonal matrix, comprise diagonal terms whose corresponding values are about equal.

18. The system according to claim 16, wherein said circuitry enables computation of an estimated value for a portion of information associated with an ith one of a reordered plurality of spatial streams by computing a difference between:
an estimated value associated with an $(N-i+1)$th one of said plurality of received signals; and
a sum comprising $(i-1)$ number of multiplicative products wherein each said multiplicative product comprises:
an $(N-j+1)$th one of said reordered plurality of spatial streams; and
an $(N-i+1)$th matrix element in a jth row of said one or both of: said upper diagonal matrix and said lower diagonal matrix;
and dividing said computed difference by a value for a diagonal matrix element in an $(N-i+1)$th row of said one or both of: said upper diagonal matrix, and said lower diagonal matrix;
wherein N is a variable that represents a number of spatial streams contained in said reordered plurality of spatial streams, and i and j are indexes, each comprising a range of values from at least 1, to no greater than N.

19. The system according to claim 18, wherein said circuitry enables determination of said reordered plurality of spatial streams by multiplying said ordered plurality of spatial streams and a transposed version of said permutation matrix.

20. The system according to claim 11, wherein said QRV decomposition matrix comprises geometric mean decomposition (GMD) matrix elements.

* * * * *